US012566959B2

(12) United States Patent　　　(10) Patent No.:　US 12,566,959 B2
Bereciartua-Perez et al.　　　　(45) Date of Patent:　Mar. 3, 2026

(54) QUANTIFYING PLANT INFESTATION BY ESTIMATING THE NUMBER OF BIOLOGICAL OBJECTS ON LEAVES, BY CONVOLUTIONAL NEURAL NETWORKS THAT USE TRAINING IMAGES OBTAINED BY A SEMI-SUPERVISED APPROACH

(71) Applicant: BASF SE, Ludwigshafen am Rhein (DE)

(72) Inventors: Aranzazu Bereciartua-Perez, Derio (ES); Artzai Picon Ruiz, Derio (ES); Aitor Alvarez Gila, Derio (ES); Jone Echazarra Huguet, Derio (ES); Till Eggers, Ludwigshafen (DE); Christian Klukas, Limburgerhof (DE); Ramon Navarra-Mestre, Limburgerhof (DE); Laura Gomez Zamanillo, Derio (ES)

(73) Assignee: BASF SE, Ludwigshafen am Rhein (DE)

( * ) Notice: Subject to any disclaimer, the term of this patent is extended or adjusted under 35 U.S.C. 154(b) by 770 days.

(21) Appl. No.: 17/799,829

(22) PCT Filed: Feb. 19, 2021

(86) PCT No.: PCT/EP2021/054233
§ 371 (c)(1),
(2) Date: Aug. 15, 2022

(87) PCT Pub. No.: WO2021/165512
PCT Pub. Date: Aug. 26, 2021

(65) Prior Publication Data
US 2023/0071265 A1　　Mar. 9, 2023

(30) Foreign Application Priority Data
Feb. 21, 2020　(EP) ..................................... 20158881

(51) Int. Cl.
*G06V 10/56*　　　(2022.01)
*G06N 3/082*　　　(2023.01)
　　　(Continued)

(52) U.S. Cl.
CPC ........... *G06N 3/082* (2013.01); *G06T 7/0012* (2013.01); *G06T 7/11* (2017.01); *G06V 10/454* (2022.01);
　　　(Continued)

(58) Field of Classification Search
CPC ...... G06V 10/82; G06V 10/56; G06V 10/467; G06T 7/00; G06T 9/002; G06T 9/00
See application file for complete search history.

(56) References Cited

U.S. PATENT DOCUMENTS

2005/0025357 A1*　2/2005　Landwehr ............. A01M 3/005
　　　　　　　　　　　　　　　　　　382/224
2009/0153659 A1*　6/2009　Landwehr .............. G06V 20/66
　　　　　　　　　　　　　　　　　　382/165
　　　(Continued)

FOREIGN PATENT DOCUMENTS

CN　　　104598908 A　*　5/2015　.......... G06K 9/6218
CN　　　106504258 A　*　3/2017
　　　(Continued)

OTHER PUBLICATIONS

Attada at al., A Methodology for Automatic Detection and Classification of Pests using Optimized SVM in Greenhouse Crops, International Journal of Engineering and Advanced Technology (IJEAT), vol. 8 Issue-6, Aug. 2019, pp. 1485-1491, DOI: 10.35940/ijeat.F8133.088619.*
　　　(Continued)

*Primary Examiner* — Guillermo M Rivera-Martinez
(74) *Attorney, Agent, or Firm* — ArentFox Schiff LLP

(57)　　　ABSTRACT
A computer generates a training set with annotated images (473) to train a convolutional neural network (CNN). The
　　　(Continued)

computer receives leaf-images showing leaves and biological objects such as insects, in a first color-coding (413-A), changes the color-coding of the pixels to a second color-coding and thereby enhances the contrast (413-C), assigns pixels in the second color-coding to binary values (413-D), differentiates areas with contiguous pixels in the first binary value into non-insect areas and insect areas by an area size criterion (413-E), identifies pixel-coordinates of the insect areas with rectangular tile-areas (413-F), and annotates the leaf-images in the first color-coding by assigning the pixel-coordinates to corresponding tile-areas. The annotated image is then used to train the CNN for quantifying plant infestation by estimating the number of biological object such as insects on the leaves of plants.

16 Claims, 21 Drawing Sheets

(51) Int. Cl.

| | |
|---|---|
| *G06T 7/00* | (2017.01) |
| *G06T 7/11* | (2017.01) |
| *G06V 10/44* | (2022.01) |
| *G06V 10/762* | (2022.01) |
| *G06V 10/764* | (2022.01) |
| *G06V 10/82* | (2022.01) |
| *G06V 20/10* | (2022.01) |

(52) U.S. Cl.
CPC ............ *G06V 10/56* (2022.01); *G06V 10/762* (2022.01); *G06V 10/764* (2022.01); *G06V 10/82* (2022.01); *G06V 20/10* (2022.01); *G06V 20/188* (2022.01); *G06T 2207/20081* (2013.01); *G06T 2207/20084* (2013.01)

(56) References Cited

U.S. PATENT DOCUMENTS

| | | | | |
|---|---|---|---|---|
| 2016/0148104 A1* | 5/2016 | Itzhaky | .................... | G06N 3/08 706/12 |
| 2018/0082412 A1* | 3/2018 | Greenberg | ............ | G06T 7/0002 |
| 2019/0034736 A1* | 1/2019 | Bisberg | .................... | A01G 7/00 |
| 2019/0050948 A1* | 2/2019 | Perry | ..................... | G06Q 30/02 |
| 2019/0073534 A1* | 3/2019 | Dvir | ...................... | G06T 7/0012 |
| 2019/0239502 A1* | 8/2019 | Palomares | ........... | G05D 1/0246 |

FOREIGN PATENT DOCUMENTS

| | | | |
|---|---|---|---|
| CN | 107 292 314 A | 10/2017 | |
| CN | 110363103 A | * 10/2019 ......... | G06K 9/00624 |

OTHER PUBLICATIONS

Sladojevic et al., Deep Neural Networks Based Recognition of Plant Diseases by Leaf Image Classification, Computational Intelligence and Neuroscience, vol. 2016, Article ID 3289801, pp. 1-11, DOI: 10.1155/2016/3289801.*

Masood et al., I.J. Modern Education and Computer Science, 2016, 1, pp. 24-32, DOI: 10.5815/ijmecs.2016.01.04.*

Deng et al., Research on insect pest image detection and recognition based on bio-inspired methods, Biosystems Engineering, vol. 169, 2018, pp. 139-148, DOI: 10.1016/j.biosystemseng.2018.02.008.*

Mohanty et al., Using Deep Learning for Image-Based Plant Disease Detection, METHODS article, Front. Plant Sci., Sep. 21, 2016, Sec. Technical Advances in Plant Science, vol. 7—2016, pp. 10-10, DOI: 10.3389/fpls.2016.01419.*

Patrício et al., Computer vision and artificial intelligence in precision agriculture for grain crops: A systematic review, Computers and Electronics in Agriculture, vol. 153, 2018, pp. 69-81, doi: 10.1016/j.compag.2018.08.001.*

Espinoza et al., Combination of image processing and artificial neural networks as a novel approach for the identification of Bemisia tabaci and Frankliniella occidentalis on sticky traps in greenhouse agriculture, Computers and Electronics in Agriculture, vol. 127, 2016, pp. 495-505, doi: 10.1016/j.compag.20.*

Boulent et al., Convolutional Neural Networks for the Automatic Identification of Plant Diseases, Front Plant Sci, Jul. 23, 2019, vol. 10, Art. 941, pp. 1-15, doi: 10.3389/fpls.2019.00941.*

Goclawski, et al., Neural network segmentation of images from stained cucurbits leaves with colour symptoms of biotic and abiotic stresses, International Journal of Applied Mathematics and Computer Science, vol. 22, pp. 669-684, doi: 10.2478/v10006-012-0050-5.*

International Search Report and Written Opinion of International Application No. PCT/EP2021/054233 mailed Sep. 13, 2021, 19 pgs.

Liu, et al., "Recognition of Pyralidae Insects Using Intelligent Monitoring Autonomous Robot Vehicle in Natural Farm Scene", arxiv.org, arXiv:1903.10827, Cornell University, Mar. 26, 2019, 14 pgs.

Mohanty, et al. "Using Deep Learning for Image-Based Plant Disease Detection", Frontiers in Plant Science, Sep. 22, 2016, vol. 7, Article 1419, 10 pgs.

\* cited by examiner insect-annotated leaf-image 471

191
expert user leaf-annotated plant-image 461

$$N_{EST} = \int_{k=1 \text{ to } K}$$

(CNN 272)

810 receive leaf-images in first color-coding 820 change color-coding to second color-coding 830 assigning binary values 840 differentiate area size 850 identify area coordinates 860 assign area coordinate to first-color coding

800

QUANTIFYING PLANT INFESTATION BY ESTIMATING THE NUMBER OF BIOLOGICAL OBJECTS ON LEAVES, BY CONVOLUTIONAL NEURAL NETWORKS THAT USE TRAINING IMAGES OBTAINED BY A SEMI-SUPERVISED APPROACH

CROSS-REFERENCE TO RELATED APPLICATIONS

This application is a national stage entry under 35 U.S.C. § 371 of International Application No. PCT/EP2021/054233, filed on Feb. 19, 2021, which claims the benefit of priority of European Application No. 20158881.1, filed on Feb. 21, 2020, the disclosures of which are hereby incorporated by reference herein in their entireties.

TECHNICAL FIELD

The disclosure generally relates to image processing by computers, and more in particular relates to techniques for quantifying plant infestation by estimating the number of biological objects such as insects on plant leaves.

BACKGROUND

Introduction

Insects of many species live on plant leaves. For example, whiteflies live on the leaves of eggplants.

In the broadest sense, the insects interact with the plant (for example by consuming part of the leaves). The insects can cause diseases or other abnormal conditions of the plant. Eventually, the plant does not survive the presence of the insects. But in agriculture, the plants should become food (i.e. crop for humans or animals), and insects being present on leaves are not desired at all. Food security is of vital importance.

Usual terms for such phenomena are "infestation" and "pest". Farmers apply countermeasures (e.g., treatment by applying insecticides) in order to remove the insects.

However, applying countermeasures may cause further problems or challenges. Countermeasures must be specific to particular insects, for example to remove the whiteflies but to keep the bees and others. Countermeasures should also take the quantity of the insects into account.

Quantifying the infestations, such as by counting insects (on plant leaves) is therefore an important task for pest management.

In theory, farmers could visually inspect the plant and could count the insects (taking the insect development stages into account). As different people have different knowledge (regarding insects) and have different eyes, different people would arrive at different numbers.

Using computer vision techniques appears as an improvement. A well-known (classical or traditional) approach is the extraction of image features with subsequent classification. However, there are many constraints arising. The constraints have many aspects, such as limitations of the computers and cameras, non-ideal conditions in the field and constraints related to the insects themselves.

Boyi Liu et al.: "Recognition of Pyralidae Insects Using Intelligent Monitoring Autonomous Robot Vehicle in Natural Farm Scene", CORNELL UNIVERSITY LIBRARY, 201 OLIN LIBRARY CORNELL UNIVERSITY ITHACA, NY 14853 explains an approach to recognize insects (of a particular species) by processing images. Thereby, the computer separates insects from the background by color-processing techniques such as by changing the color-coding, and the computer recognizes the insects as belonging to a particular species by implementing a support vector machine.

Mohanty SP, Hughes DP and Salathé M (2016) Using Deep Learning for Image-Based Plant Disease Detection. Front. Plant Sci. 7: 1419. doi: 10.3389/fpls.2016.01419 describes neural networks that classify images according to crop-disease pairs that are depicted on the images. More in detail, the paper explains a two-step approach with removing background information from the images by using color re-coding and classifying the pre-processed images by a convolutional neural network.

Annotations

There is a requirement to provide a relatively large number of annotated images. For example, annotations identify the location of insects by coordinates. Annotations can also differentiate between insect species and growing stages of the insects.

Traditionally, a computer receives annotations from human expert users who inspect the images on a display. Users interact with the computer in variations, known as inter-rater variability (several persons) and intra-rater variability (same person in different moments). Zooming in and out is a further source of possible errors and variations.

SUMMARY

The constraints are addressed by a computer system, by computer-implemented methods and by computer program products. The computer program products—when loaded into a memory of a computer and being executed by at least one processor of the computer—perform the steps of the computer-implemented methods.

A computer-implemented method for generating a training set with annotated images provide improvements. The annotated images are to be used to train a convolutional neural network (CNN) for quantifying plant infestation. The CNN estimates the number of insects on leaves of plants.

The computer receives leaf-images showing leaves and showing insects on the leaves. The leaf-images are coded in a first color-coding. The computer changes the color-coding of the pixels of the leaf-images to a second color-coding. The contrast between the pixels for the insects and the pixels for the leaves is higher in the second color-coding than in the first color-coding. The computer assigns pixels in the second color-coding to a first binary value or to a second binary value. The computer differentiates—in the leaf-images with binary coding—areas with contiguous pixels in the first binary value into non-insect areas and insect areas by an area size criterion. The computer identifies pixel-coordinates of the insect areas, wherein the pixel-coordinates identify rectangular tile-areas with insects in the center. The computer annotates the leaf-images in first color-coding by assigning the pixel-coordinates to corresponding tile-areas and thereby obtains the annotated image.

Optionally, the computer receives the leaf-images as images that show isolated segmented leaves. Optionally, the computer receives the images with isolated segmented leaves by performing leaf segmentation with a CNN that has been trained by processing leaf-annotated plant images. Optionally, the computer receives the first color-coding as RGB-coding and performs changing the color-coding with a transformation from RGB-coding to XYZ-coding.

Optionally, changing the color-coding further comprises to obtain the second color-coding by disregarding the Z-component from the XYZ-coding. Optionally, the computer assigns the binary values by clustering the pixels into color clusters. Optionally, the computer identifies the color clusters by a support-vector machine. Optionally, the computer identifies the pixel-coordinates as squares with 96×96 pixels each.

Optionally, the computer further classifies the tiles according to insect classes and thereby sorts out false positives.

From a different perspective, a computer-implemented method for quantifying plant infestation by estimating the number of insects on leaves of a plant uses these annotations.

In a production phase, the computer applies convolutional neural networks that had been trained previously in a training phase. The production phase is summarized first:

The computer receives a plant-image taken from a particular plant. The plant-image shows at least one of the leaves of the particular plant, the so-called main leaf. The computer uses a first convolutional neural network to process the plant-image to derive a leaf-image being a contiguous set of pixels that show a main leaf of the particular plant completely (i.e. as a whole). The first convolutional neural network has been trained by a plurality of leaf-annotated plant-images, wherein the plant-images had been annotated to identify main leaves. The computer splits the leaf-image into a plurality of tiles. The tiles are segments or portions of the plant-image having pre-defined tile dimensions. The computer uses a second convolutional neural network to separately process the plurality of tiles to obtain a plurality of density maps having map dimensions that correspond to the tile dimensions.

In a training phase, the network has been trained by processing insect-annotated plant-images. A first subset of insect-annotated plant-images is obtained by interacting with an expert user (human-made annotations), and a second subset insect-annotated plant-images is obtained by performing the mentioned method for generating a training set (computer-made annotations). The training comprised the calculation of convolutions for each pixel based on a kernel function, leading to density maps. The density maps have different integral values for tiles showing insects and tiles not showing insects. In the production phase, the computer combines the plurality of density maps to a combined density map in the dimension of the leaf-image, and integrates the pixel values of the combined density map to an estimated number of insects for the main leaf.

DETAILED DESCRIPTION

Figure 1:
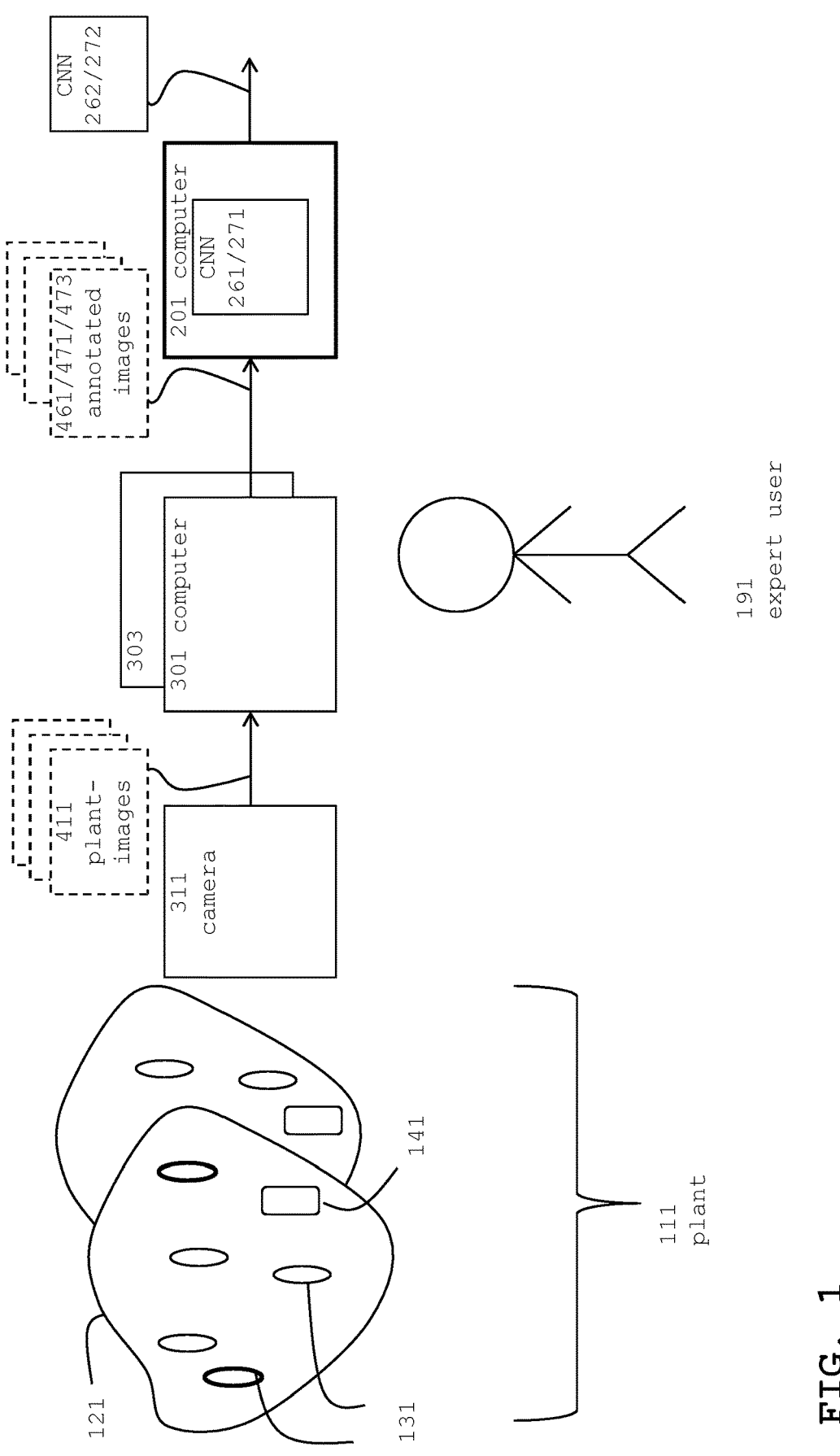
FIG. 1 illustrates an overview to a computer-implemented approach to teach—in a training phase—convolutional neural networks (CNN) to count insects on leaves.

The description starts by explaining some writing conventions.

The term "image" stands for the data-structure of a digital photograph (i.e., a data-structure using a file format such as JPEG, TIFF, BMP, RAW or the like). The phrase "take an image" stands for the action of directing a camera to an object (such as a plant) and letting the camera store the image.

The description uses the term "show" when it explains the content of images (i.e., the semantics), for example in phrases such as "the image shows a plant". There is however no need that a human user looks at the image. Such computer-user interactions are expressed with the term "display", such as in "the computer displays the plant-image to an expert", where an expert user looks at the screen to see the plant on the image.

The description uses the term "insect" for simplicity and for convenience. It is noted that "insect" is a noun (in usual language) that most readers can easily apply for counting. The skilled person reading "one insect" or "two insects" immediately understands. The term "insect" is also used to represent biological objects that are located on parts of the plant be counted (i.e., on the leaves). A biological object (to be counted) has a physical size that is relatively smaller than the part on that it is located. It is also noted that the objects are located on one part. Since the plant images are processed to images showing one part (such as one leaf, by segmentation), the size relation also transfers to the image. To illustrates that: an insect sitting with some legs on a first leaf, and sitting with the other legs on a second leaf is not counted because the image would be segmented to one of the leaves. Or, a relatively large insect that shows up on the image covering a leaf and covering a branch could not be counted.

In terms of biological taxonomy, the biological objects can be insects or can be arachnids (i.e., being arthropoda), or the biological objects can be mollusca (not arthropod). The internal structure of the biological objects does not matter, as long as it fits the size criterion. On other words, it does not matter is the object has an exoskeleton, a segmented body, and paired jointed appendages (as arthropods have) or not. Further, for the computer, the different number of legs (e.g., insects 6 legs, arachnids 8 legs, or even no legs as with snails) does not matter for the computer. The objects can also be spots on the surface of the plant parts (spots that are the result of biological processes, such as fungi interacting with the plant or the like, animal excrements, etc.). The person of skill in the art can identify suitable measures (e.g., countermeasures). The use of the term "insects" is applicable to phrases such as "insect-annotated" or the like to the meaning "object-annotated".

Further, the interaction of the biological object with the plant (or with the stem branch, leave etc. part) does not matter. The biological object can be pest or beneficial.

The term "annotation" stands for meta-data that accompanies an image to identify particular properties regarding the content (of the image). For example, an annotation can identify the border or edge of a plant leaf (i.e., "leaf-annotation"), or can identify presence, type, location etc. of an insect sitting on that leaf (i.e., "insect-annotation")

The term "annotated image" indicates the availability of such meta-data for an image (or for a sub-region of that image), but there is no need to store the meta-data and the image in the same data-structure. Occasionally, the drawings illustrate annotations as part of an image, such as by polygon and/or dots, but again: the annotations are meta-data and there is no need to embed them into the data-structure of the image.

Depending on the process to create the insect annotations, the description differentiates two basic types of insect annotations. First, a human-made insect annotation is obtained through an expert user who looks at the display of an image and interacts with a computer (resulting in a "insect-by-human-annotated images" or short "human-annotated images"). Second, a computer-made annotation is obtained by a computer that performs a method for providing annotated images (cf. FIGS. 14-18, "insect-by-computer-annotated images", or "computer-annotated images").

In general, the term "insect" stands for animalia in the phylum "Arthropoda" or 1ARTHP (EPPO-code by the European and Mediterranean Plant Protection Organization). In implementations, the insects are of the subphylum "Hexapoda" (1HEXAQ).

The term "stage" (also "development stage", "growing stage") identifies differences in the life-cycle (or metamorphosis) of insects, wherein an insect in a first stage has a different visual appearance than an insect in a second, subsequent stage. Biologists can differentiate the stages (or "stadia") by terms such as egg, larva, pupa, and imago. Other conventions can also be used, such as "adults" and "nymphs", or even standardized numerical identifiers such as "n1n2", "n3n4" and so on. Development stages of the plants are not differentiated.

The term "count" is short for "estimating a number", such as for estimating the number of insects on a leaf.

The description uses the term "train" as a label for a first process—the "training process"—that enables CNNs to count insects, and for the particular task to train a particular CNN by using annotated images.

For convenience, the description refers to hardware components (such as computers, cameras, mobile devices, communication networks) in singular terms. However, implementations can use multiple components. For example, "the camera taking a plurality of images" comprises scenarios in that multiple cameras participate so that some images are taken from a first camera, some image are taken from a second camera and so on.

In the figures, the suffixes "-1, -2 . . . " and so on distinguish like items; and suffixes "(1), (2) . . . " distinguish different items.

Structure of the Document

Figure 2:
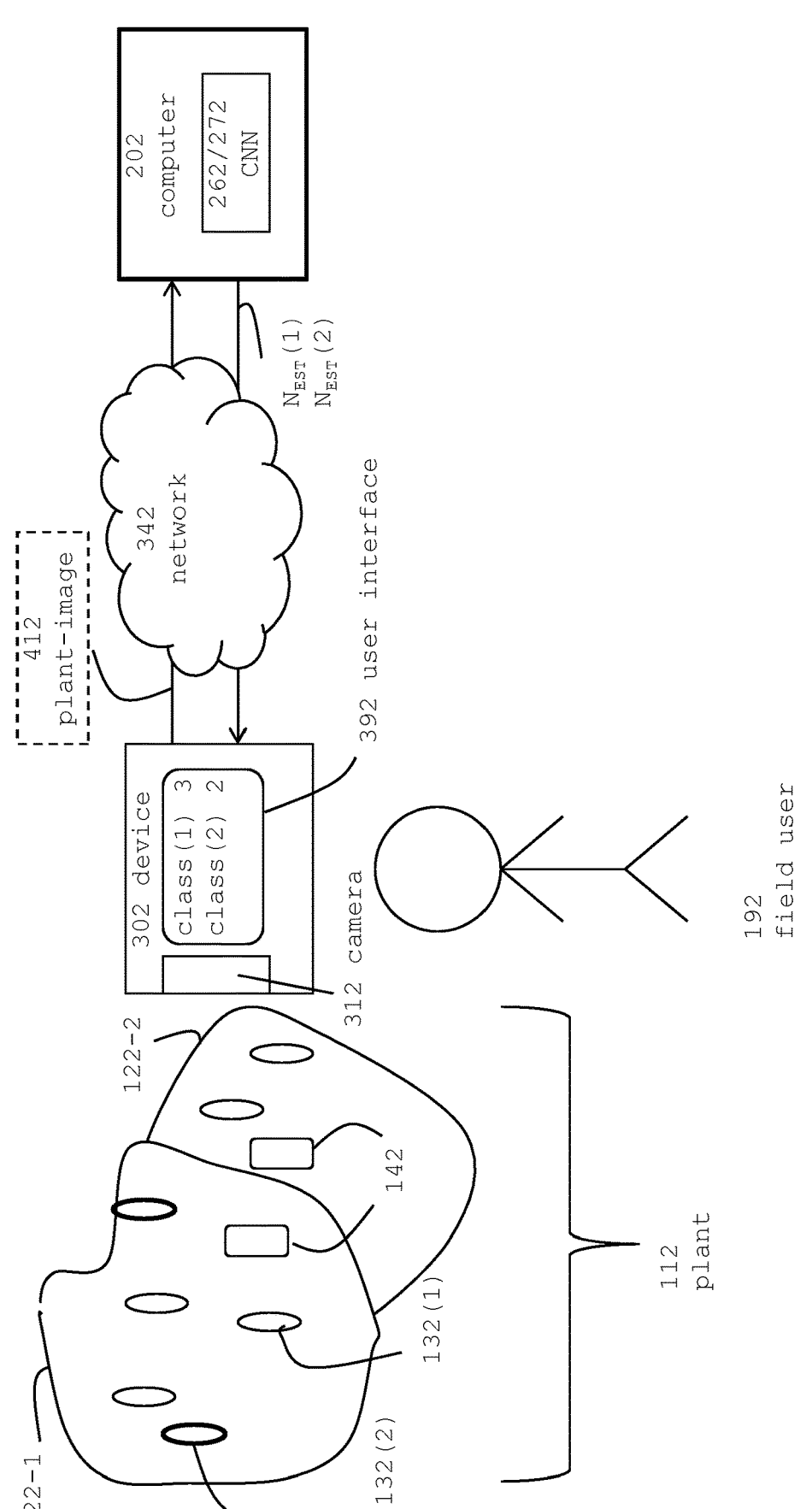
FIG. 2 illustrates an overview to a computer-implemented approach to count insects on leaves during a production phase.
Figure 3:
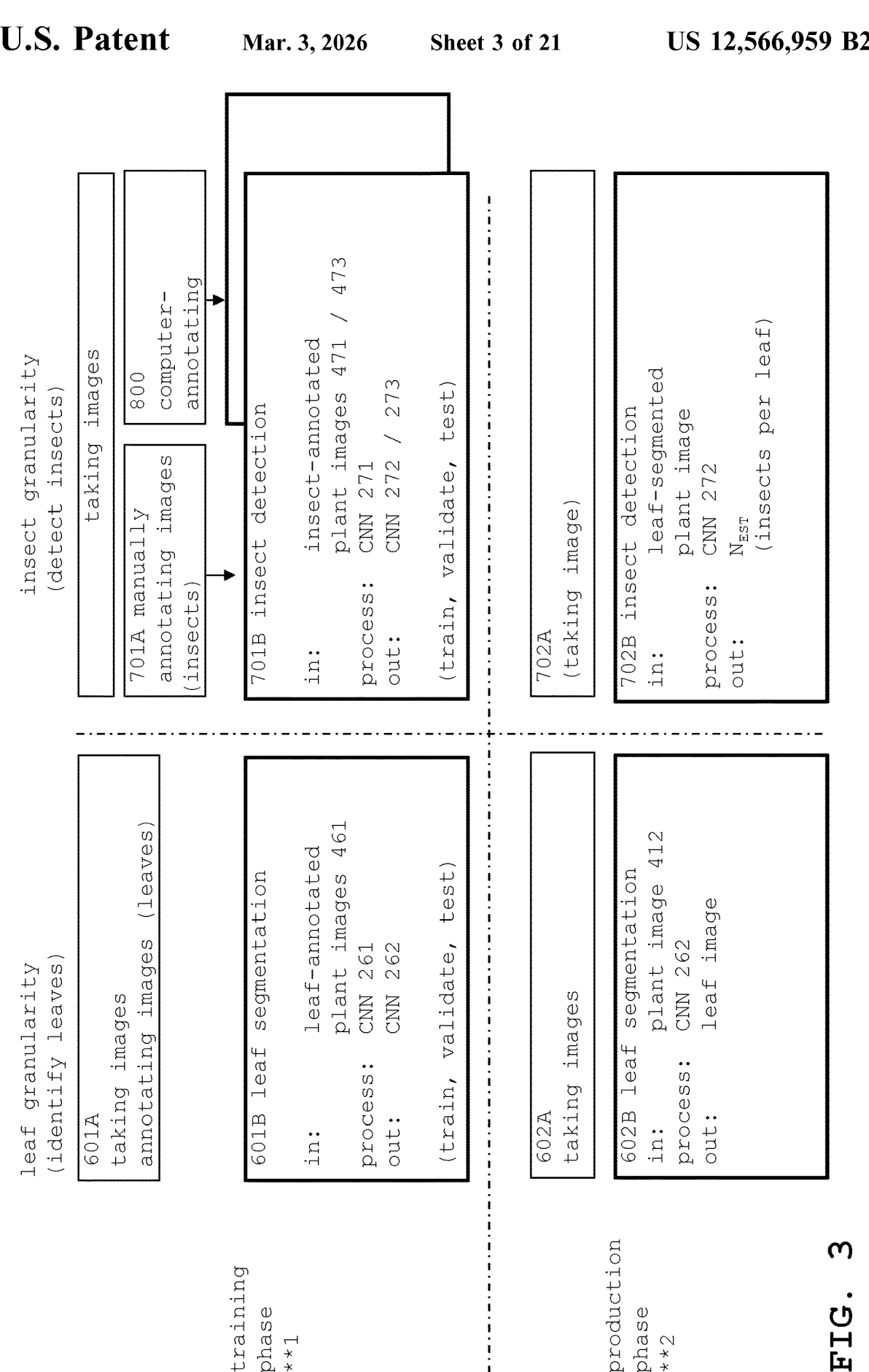
FIG. 3 illustrates an overview of computer-implemented methods.
Figure 4:
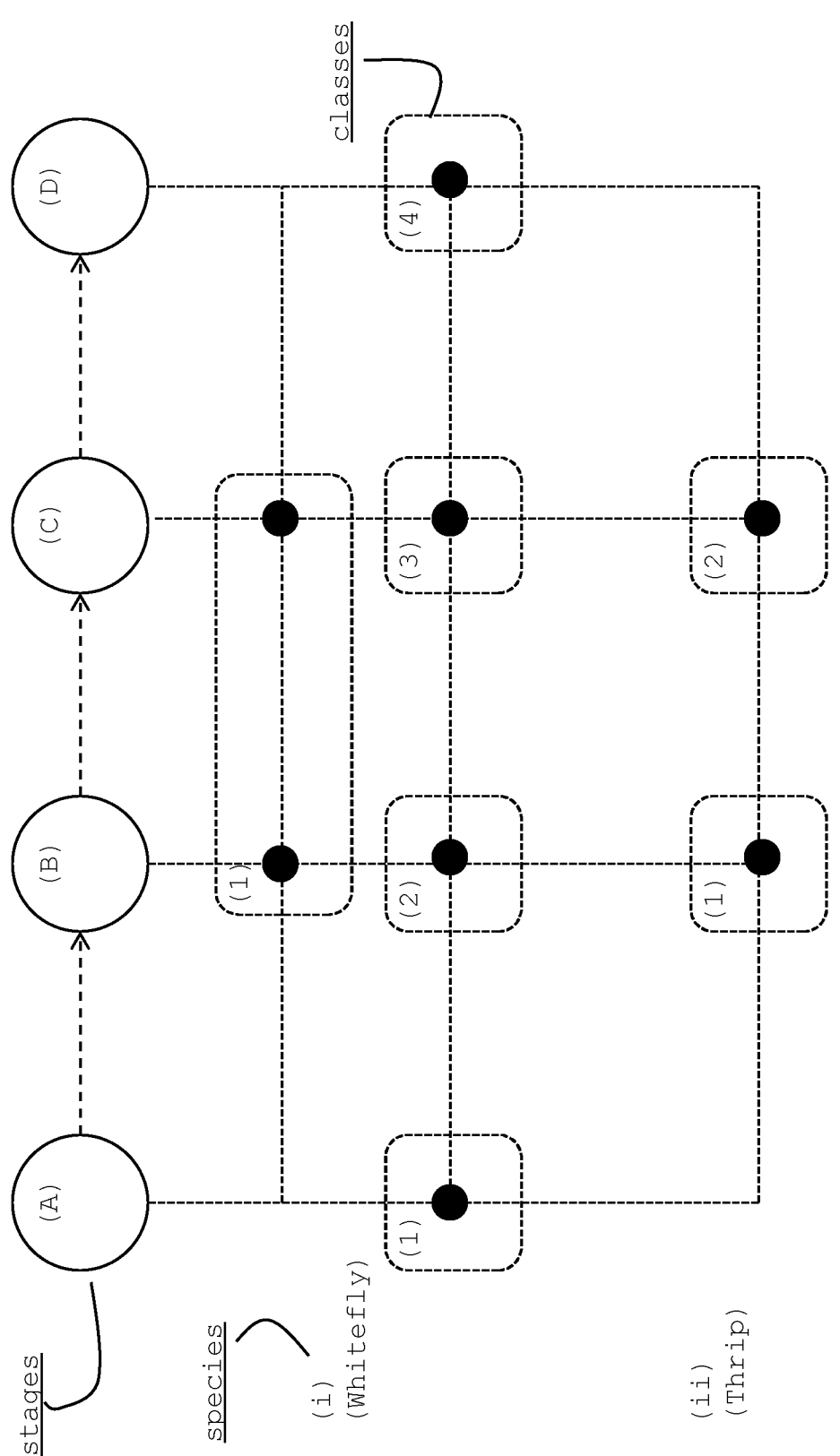
FIG. 4 illustrates a diagram with insect development stages, insect species, and counting classes.

Referring to FIGS. 1-3, the description provides an overview to the application of CNNs in two phases, and thereby introduces pre-processing activities as well as computer-implemented methods. Referring to FIG. 4, the description introduces insects in different development stages to be counted. Referring to FIGS. 5-12, the description investigates details (regarding plants, images, image portions to be processed). With FIG. 13, the description discusses accuracy.

Further, providing and using computer-made annotations will be discussed in connected with FIGS. 14-19.

Overview to Training and Production Phases

FIGS. 1-3 illustrate overviews to computer-implemented approaches as in FIG. 1, to train convolutional neural networks (CNN) to count insects on leaves in a training phase **\*\*1, and as in FIG. 2, to quantify infestation by actually counting insects on leaves during a (subsequent) production phase \*\*2 (FIG. 2**).

Throughout this description, references noted as **\*\*1/\*\*2** stand for elements that are similar but that have different use in both phases.

From left to right, FIGS. 1-2 illustrate plants 111/112 (with leaves and insects), cameras 311/312 to take plant-images 411/412, and computers 201/202 with CNNs to perform computer-implemented methods 601B/602B/701B/702B. The figures also illustrate human users 191/192.

FIGS. 1-2 illustrate computers 201/202 by rectangles with bold frames. Computers 201/202 implement methods 601B, 602B, 701B and 702B (FIG. 3) by techniques that are based on Machine Learning (ML). FIGS. 1-2 also illustrate computer 301 and mobile device 302, performing auxiliary activities (or participating therein), such as taking images, transmitting images, receiving annotations, and forwarding results to other computers, such as estimation values.

Some of the auxiliary activities are pre-processing activities that prepare method executions. In FIG. 3, the pre-processing activities are illustrated by references 601A, 602A, 701A and 702A.

Computers 201/202 use CNNs and other modules to be explained below (such as user interfaces, databases, splitter and combiner modules etc.). While FIGS. 1-2 just introduce the CNNs, the other figures provide details for pre-processing images and for setting parameters to the CNNs. CNNs 261 and 271 are being trained in the training phase **\*\*1 to become trained CNNs 272 and 272**, respectively. In other words, the difference between untrained and trained CNNs is the availability of parameters obtained through training.

FIG. 3 illustrates an overview to computer-implemented methods 601B, 602B, 701B and 702B. The methods are illustrated in a matrix. In general, counting insects on leaves is divided into a sequence, with simplified: a first sub-sequence (illustrated by the column on the left side) to identify leaves on images, and a second sub-sequence (illustrated by the column on the right side), to count the insects on the identified leaves.

FIG. 3 differentiates pre-processing activities 601A, 602A, 701A, and 702A (such as taking images and annotating images) from computer-implemented methods 601B, 602B, 701B, and 702B with machine-learning techniques.

Methods 601B and 602B are performed with CNNs 261/262, and methods 701B and 702B are performed with CNNs 271/272. CNNs 261/262 and CNNs 271/272 differ from each other by parameters (explained below).

The CNNs use density map estimation techniques, where—simplified—the integral of the pixel values leads to the estimated insect numbers. In other words, counting is performed by calculating an integral. The estimated numbers $N_{EST}$ can be non-integer numbers. For the above-mentioned purpose (to identify appropriate countermeasures against the infestation), the accuracy of $N_{EST}$ is sufficient.

Using density maps to count objects is explained by "Lempitsky, V., Zisserman, A., 2010. Learning To Count Objects in Images. Neural Inf. Process. Syst. 1-9."

Training Phase

Training phase **1 is illustrated in the first row of FIG. 3 in reference to FIG. 1.

As illustrated by pre-processing 601A, camera 311 takes a plurality of plant-images 411 (in an image acquisition campaign).

Computer 301 interacts with expert user 191 to obtain leaf-annotations and to obtain insect-annotations. User 191 can have different roles (details in FIG. 6). Combinations of images and annotations are provided as annotated images 461, 471. For convenience, the description differentiates leaf-annotated plant-images 461 and insect-annotated leaf-images 471. It is however noted that a particular image can have both leaf-annotations and insect-annotations.

In addition to letting expert user 191 providing the annotations (human-made annotations), there is method 800 for providing a training set (with annotated image). Method 800 bypasses the human user and generate computer-made annotations (i.e. images 473).

Computer 301 forwards annotated images 461, 471 to computer 201. Optionally, computer 303 forwards images 473 to computer 201.

In performing computer-implemented method 601B, computer 201 (FIG. 1) receives the plurality of plant-images in combination with the leaf-annotations (collectively "leaf-annotated plant-images"). Computer 201 then uses a sub-set of the plurality and trains CNN 261 to identify a particular leaf in a plant-image (that is not annotated). Thereby, computer 201 converts un-trained CNN 261 into trained CNN 262. In other words, CNN 262 is the output of computer 201.

In performing method 701B, computer 201 receives the plurality of leaf-annotated plant-images in combination with insect-annotations (collectively "insect-annotated leaf-images"). Computer 201 then trains CNN 271 to count insects on particular leaves. Thereby, computer 201 turns un-trained CNN 271 into trained CNN 272. In other words, CNN 272 is output of computer 201 as well.

Optionally, computer 201 can also perform method 701B in two variations. In the first variation, computer 201 trains CNN 271 with human-annotated images 471 and in the second variation, computer 201 trains CNN 271 with computer-annotated images 473. Training uses the results of the both variations, but in terms of the loss function, computer 201 puts more weight on human-annotated images 471.

It is noted that the description assumes the annotations to be made for the same plurality of plant-images 411. This is convenient, but not required. The pluralities can be different. For example, the plurality of plant-images 411 to be leaf-annotated can show non-infested plants. Using leaf-annotated plant-images 471 (from such healthy plants) to further provide insect-annotations would fail because there would be no insects to annotate. Providing insect-annotations could be performed for images that are not segmented to leaves.

Production Phase

Production phase **2 is illustrated in the second row of FIG. 3, in reference to FIG. 2.

As illustrated by pre-processing 602A, camera 312 of device 302 takes plant-image 412 and forwards it to computer 202.

In performing method 602B, computer 202 (FIG. 2) uses CNN 262 to identify a particular leaf (and thereby creates a leaf-image). Subsequently, in performing method 702B, computer 202 uses CNN 272 and processes leaf-image 422. Thereby, computer 202 counts insects (and potentially other objects if trained accordingly) on that particular leaf. Thereby, computer 202 obtains the estimated number of insects per leaf $N_{EST}$ as the result.

In scientific literature, using trained CNNs to obtain results is occasionally called "testing".

The description now explains further aspects and implementation details, again in view of FIGS. 1-2.

Training Phase with Details

Returning to FIG. 1, it illustrates plant 111. Plant 111 has leaves 121, and leaves 121 are occupied by insects 131 and non-insect objects 141. Camera 311 takes (a plurality of) plant-images 411 that are processed in computer 201 during training phase **1.

Figure 6:
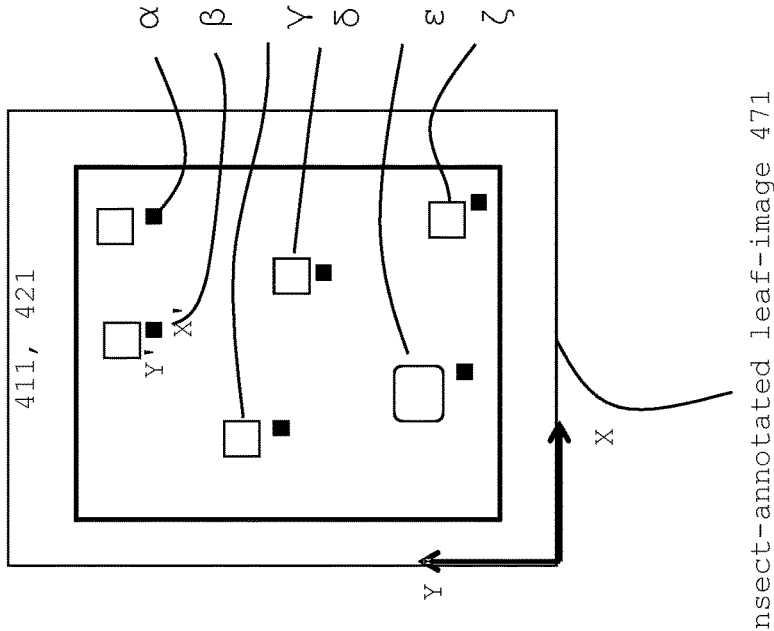
FIG. 6 illustrates a user interface of a computer as well as an expert user who annotates images.
Figure 6:
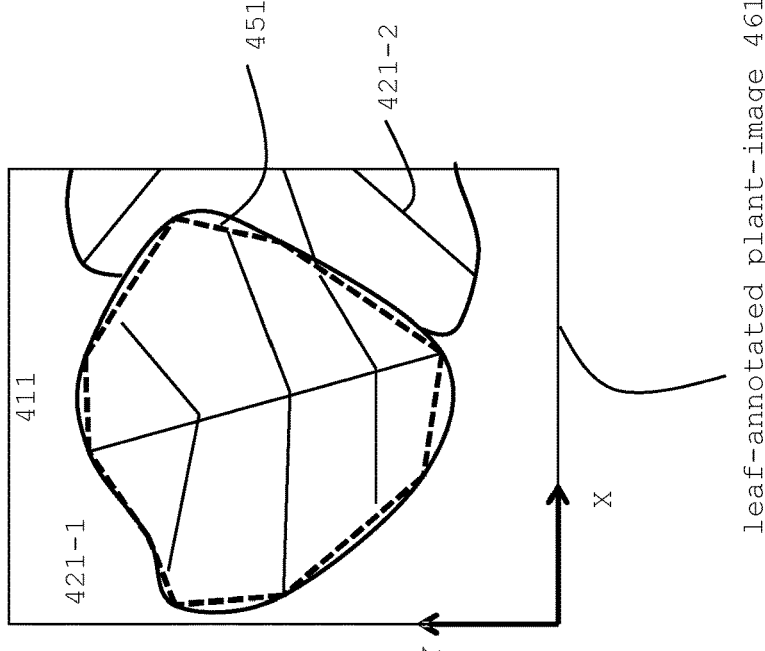

Training phase **1 has two sub-phases. The first sub-phase comprises activities such as taking the plurality of plant-images 411, letting expert user 191 provide annotations to plant-images 411 to computer 301. There are annotations specific to the leaves, and there are annotations specific to the insects. Computer 301 receiving annotations results in annotated images 461, 471 that are leaf-annotated images and insect-annotated images (FIG. 6). Receiving annotations can also be considered as the supervised learning part. In the second sub-phase, computer 201 then uses annotated images 461, 471 to train CNN 261 to identify a main leaf (i.e. a semantic segmentation of the plant image) and to train CNN 271 to identify the insects (i.e., on the main leaf that was identified earlier). Persons of skill in the art can apply suitable training settings.

Although computer 201 is illustrated by a single box, it can be implemented by separate physical computers. The same principle applies for plant 111 and for camera 311. The plant and the camera do not have to be the same for all images. It is rather expected to have plant-images 411 from cameras 311 with different properties. Also, the plurality of images 411 represents a plurality of plants 111. There is no need for a one-to-one relation, so one particular plant may be represented by multiple images.

Training the CNNs can be seen as the transition from the training phase to the production phase. As in FIG. 1, CNNs 261 and 271 are being trained to become trained-CNNs 262 and 272.

There is no need to copy the CNNs (quasi from figure to figure). The person of skill in the art can take over parameters from one network to another, such as from CNN 261 (of FIG. 1) to CNN 262 (of FIG. 2) and from CNN 271 (of FIG. 1) to CNN 272 of (FIG. 2).

As in FIG. 1, a progress of time can be seen from left to right. It does not matter if during training phase 1, plant 111 remains alive; data communication goes into one direction only. However, in the production phase 2 to be explained with FIG. 2, timing is of vital importance for plant 112, in the real sense of the word, because the output from trained-CNNs 262, 272 is information used to treat plant 112 (or its neighbors on the field).

Training phase 1 is usually performed once, in supervised learning with expert user 191. The setting for the training phase with camera 311 taking plant-images 411 (as reference images), with expert user 191 annotating plant-images 411 (or derivatives thereof) and with computer-implemented processing will be explained. The description assumes that training phase 1 has been completed before production phase 2. It is however possible to perform training phase 1 continuously and in parallel to production phase **2.

Production Phase with Details

Returning to FIG. 2, it illustrates an overview of a computer-implemented approach by that a computer—illustrated as computer 202—counts insects 132 on leaves 122 of plants 112 in an exemplary application in an agricultural field. It does not matter if the field is located in open air or located in a green-house.

Simplified, computer 202 processes plant-image 412 received from mobile device 302 through communication network 342. In difference to training phase **1 of FIG. 1, one image 412 is theoretically enough.

Leaves 122 are so-called "infested leaves" because insects are located on them. Counting can be differentiated for insects of particular class 132(1) (illustrated by plain ovals) and—optionally—of particular class 132(2) (bold ovals). Optionally, counting can consider further classes (cf. FIGS. 4 and 11).

Non-insect objects 142 are not necessarily to be counted. Such objects 142 can be located within the leaf and can be structural elements of leaves 122, such as damages on the leaf, shining effects due to light reflection or the like. It is noted that many insects camouflage themselves. Therefore, for the computer it might be difficult to differentiate insects 132 and non-insect objects 142.

Insect classes (1) and (2) are defined by a particular insect species, and (i.e., logical AND) by a particular development stage (cf. FIGS. 2 and 4).

Figure 11A:
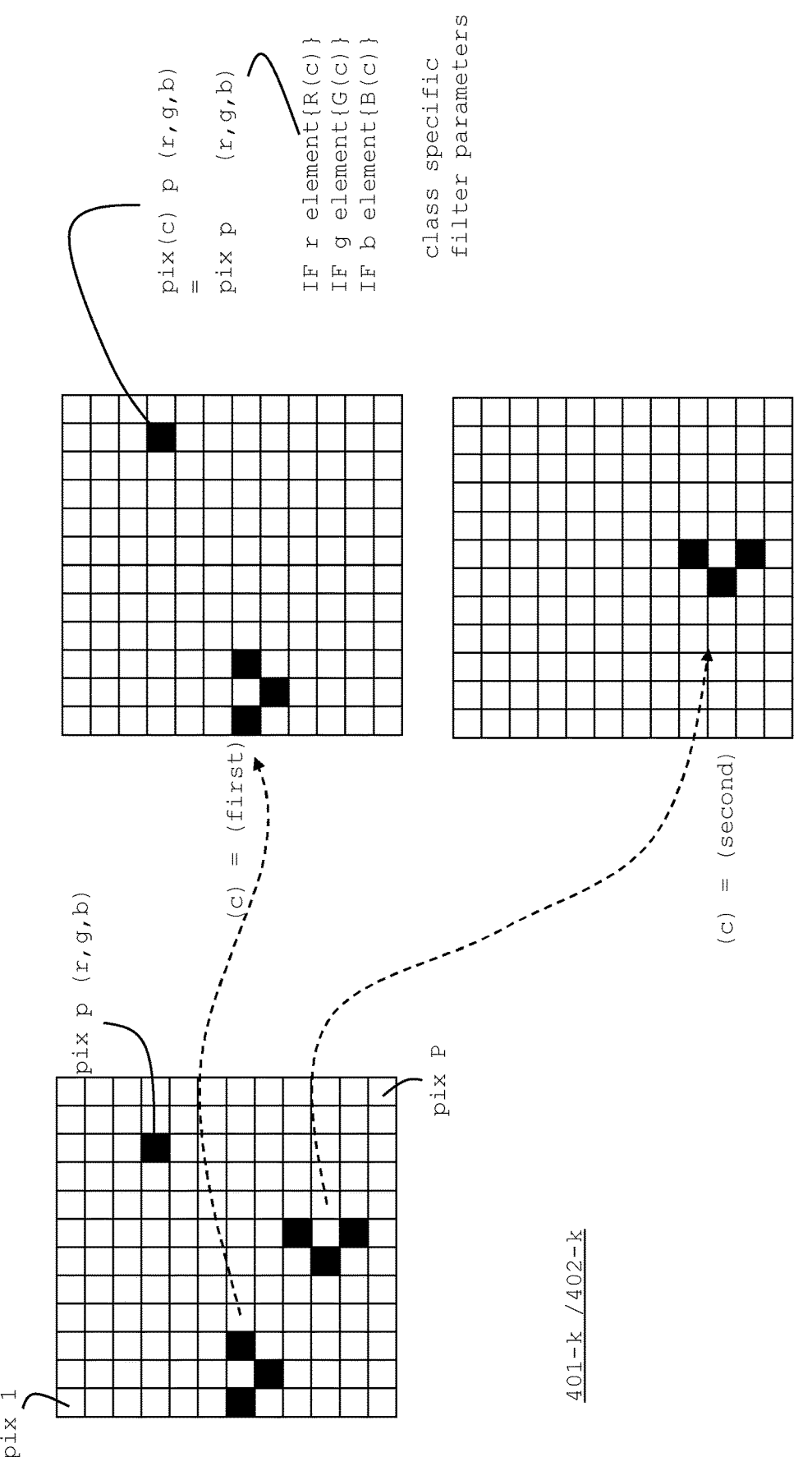
FIGS. 11A and 11B illustrate a pixel value filter that is implemented as part of a CNN layer in implementations that differentiate more than two insect classes.
Figure 11B:
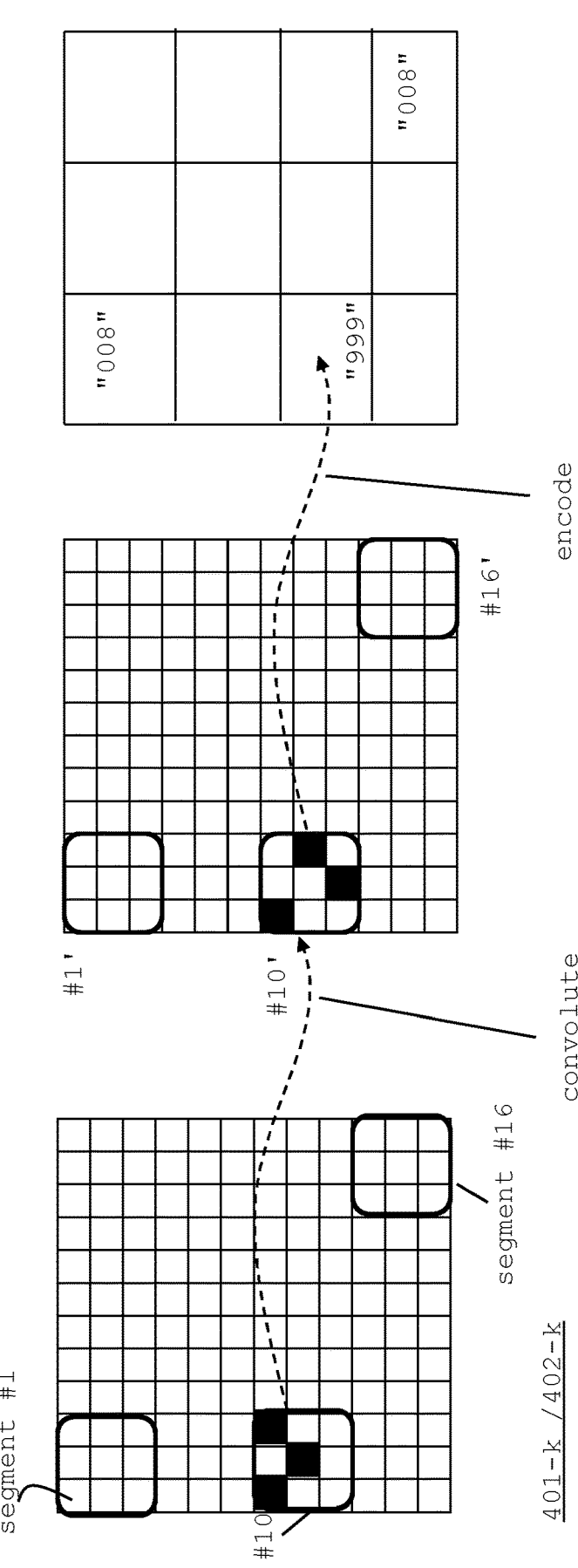
Figure 12:
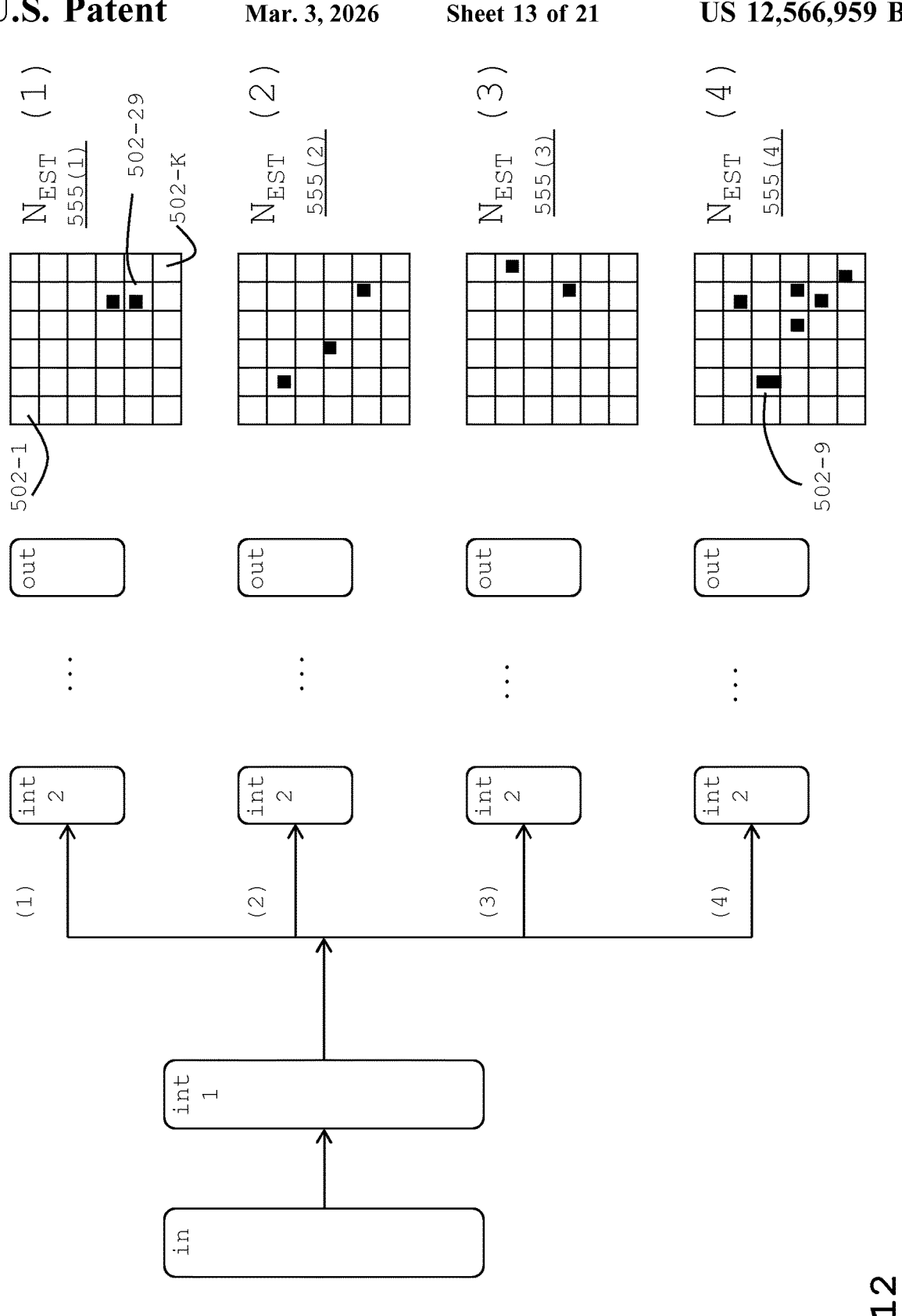
FIG. 12 illustrates a CNN with multiple output channels.

A more fine-tuned granularity with more classes is given in FIG. 4, and an adaptation of the CNNs to such granularity is given in FIGS. 11-12. As used herein, the term "insect" is used synonymous to "bug".

Plant 112 has a plurality of leaves 122. For simplicity, only two leaves 122-1 and 122-2 are illustrated. Leaves 122 are occupied by insects 132 (there is no difference to the training phase **1). For convenience, FIG. 2 is not scaled, with the size of the insects being out of proportion. Field user 192—for example the farmer who is growing plant 112—uses camera 312 of mobile device 302 to take an image of plant 112 (plant-image 412). For mobile devices having two (or more) cameras, camera 312 is conveniently the camera with the highest resolution.

Mobile device 302 can be seen as a combination of an image device (i.e. camera 312), processor and memory. Mobile device 302 is readily available to the farmers, for example as a so-called "smartphone" or as a "tablet". Of course, mobile device 302 can be regarded as a "computer". It is noted that mobile device 302 participate in auxiliary activities (cf. FIG. 3, 602A, 702A) only.

Field user 192 tries to catch at least one complete leaf (here leaf 122-1) into (at least one) plant-image 412. In other words, field user 192 just makes a photo of the plant. Thereby, field user 192 may look at user interface 392 (i.e. at the visual user-interface of device 302) that displays the plant that is located in front of camera 312.

Mobile device 302 then forwards plant-image 412 via communication network 342 to computer 202. As the illustration of communication network 342 suggests, computer 202 can be implemented remotely from mobile device 302.

Computer 202 returns a result that is displayed to user interface 392 (of mobile device 302). In the much simplified example of this figure, there are N(1)=3 insects of class (1) (i.e., insects 132(1)) and N(2)=2 insects of class (2) (i.e., insects 132(2)) counted. The numbers N(1), N(2) (or N in general) are numbers-per-leaf, not numbers per plant (here in the example for main leaf 122-1). The numbers correspond to $N_{EST}$ (with $N_{EST}$ being rounded to the nearest integer N).

Optionally, by proving infestation data that is separated by classes (such as (1) and (2)), field user 192 can identify countermeasures to combat infestation with better expectation of success.

The term "main leaf" does not imply any hierarchy with the leaves on the plant, but simply stands for that particular leaf for that the insects are counted. Adjacent leaf 122-2 is an example of a leaf that is located close to main leaf 122-1, but for that insects are not to be counted. Although illustrated in singular, plant 112 has one main leaf but multiple adjacent leaves. It is assumed that plant-image 412 represents the main leaf completely, and represents the adjacent leaves only partially. This is convenient for explanation, but not required.

It is usual that main leaf 122-1 is on top of adjacent leaf 122-2 (or leaves). They overlap each other and it is difficult to identify the edges between one from the other.

Accuracy: False Positives, False Negatives

The numbers N are derived from estimated numbers $N_{EST}$, the description describes an approach to accurately determine N.

Ideally, only insects 132 located on main leaf 122-1 are counted. Insects 132 that are not counted but that are located on main leaf 122-1 would be considered to be "false negatives", and insects that are counted but that are located on an adjacent leaf would be considered to be "false positives". As it will be explained with more detail below, counting comprises two major sub-processes: first, differentiating main and adjacent leaves (also called leaf identification, segmentation), and second, counting the insects on the main leaf only.

In other words, identifying the main leaf prior to counting keeps the number of "false negatives" and "false positives" negligible.

Implementation

The communication between mobile device 302 and computer 202 via communication network 342 can be implemented by techniques that are available and that are commercially offered by communication providers.

Figure 10:
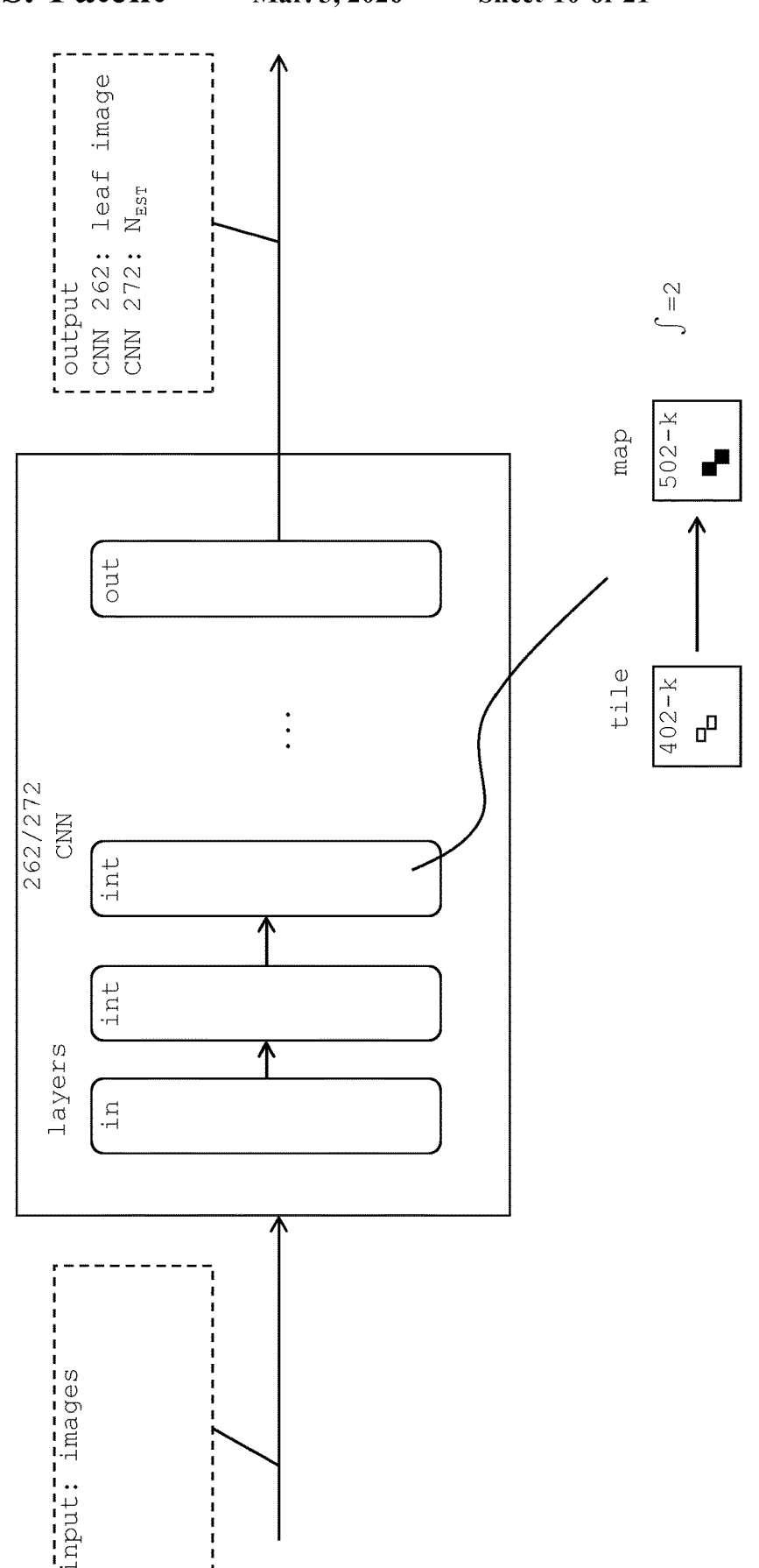
FIG. 10 illustrates a CNN with layers, in a general overview.

Computer 202 has CNN 262/272 that performs computer-implemented method 602B and 602B (details in connections with FIG. 10). CNNs 262 and 272 have been trained before (methods 601B and 701B).

In an embodiment, computers 201/202 use operating system (OS) Linux, and the module that executes methods 601B/602B, 701B/702B was implemented by software in the Python programming language. It is convenient to implement the modules by a virtualization with containers. Appropriate software is commercially available, for example, from Docker Inc. (San Francisco, California, US). In a software-as-a-service (SaaS) implementation, mobile device 302 acts as the client, and computer 202 acts as the server.

Besides CNNs 262/272, computer 202 has other modules, for example, a well-known REST API (Representational State Transfer, Application Programming Interface) to implement the communication between mobile device 302 and computer 202 can use. Computer 202 appears to mobile device 302 as a web-service. The person of skill in the art can apply other settings.

The time it takes computer 202 with CNNs 262/272 (performing the method) to obtain $N_{EST}$ depends on the resolution of plant-image 412. Performing methods 602B and 702B may take a couple of seconds. The processing time rises with the resolution of the image. (The processing time has been measured in test runs. For plant-image 412 with 4000×6000 pixels, the processing time was approximately 9 seconds.)

It is convenient, to transmit plant-image 412 in its original pixel resolution, otherwise the accuracy to count insects will deteriorate. In other words, there are many techniques to transmit images in reduced resolutions, but for this application, such techniques should be ignored here. However, transmitting a compressed image (in a loss-less format) can be possible. In modern communication networks, the bandwidth consumption (for transmitting the image in original resolution) is no problem any longer.

It is noted that for field user 192, the conditions for catching images are not always ideal. For example, there are variations in the acquisition distance (between camera and plant, users holding the mobile devices at different heights), the illumination (e.g., sunny daylight or rainy/cloudy daylight, some leaves may shadow other leaves), the surface of the plant (e.g., dust or rain-drops on the plant etc.), perspective (e.g., taking images from the side or from the top to name two extremes), focusing (e.g., sharp image for non-relevant parts of the plant), resolution (e.g., mobile devices with 24 M pixel cameras, versus devices with less pixels), and so on.

Insects, Plants and Use Cases

In the following, the description shortly investigates the objects to be counted: insects 131/132 (cf. FIGS. 1-2), but then turns to a discussion of problems with existing technology and of solution approach that is adapted to count insects.

The description uses two examples of plant/insect combinations.

In a first combination, plants 111/112 are eggplants (*Solanum melongena*, EPPO-code SOLME) and insects 131/132 are of the species whitefly (*Bemisia tabaci* EPPO-code BEMITA).

In a second combination, plants 111/112 are eggplants as well, and insects 131/132 are of the species thrips (*Franklinella occidentalis*, EPPO-code FRANOC).

It is noted that the person of skill in the art can differentiate such (and other combinations) without further explanations herein. Taking images, annotating images, training the CNNs, counting insects (cf. pre-processing and method execution in FIG. 3) are usually made for one of the combinations.

Exceptions from the general rule are available. Having different plant species in the training phase **\*\*1 and the production phase \*\*2 can be possible if the plants are similar in appearance. In that case pre-processing 601A and executing method 601B (i.e. to train CNN 261/262 to segment leaves) would be performed with a first plant species (e.g., eggplant) and pre-processing 602A and executing method 602**B would be performed with a second plant species. The second plant species can belong to other crops such as for example cotton, soy bean, cabbage, maize (i.e., corn).

Since the infestation is made by the insects, the description focuses on the insects. It is a constraint that insects change appearance in the so-called metamorphosis with a sequence of development stages.

Granularity to Quantify Infestation

As the accuracy in obtaining data regarding infestation is related to the efforts to obtain the data, the description now introduces granularity aspects.

FIG. 4 illustrates a diagram with development stages (A), (B), (C) and (D) for insects 131/132 (cf. FIGS. 1-2), insect species (i) and (ii), and counting classes (1), (2), (3), (4)

As illustrated by arrows (from left to right), the development stages occur in a predefined sequence with state transitions: from stage (A) to (B), from (B) to (C), from (C) to (D). The arrows are dashed, just to illustrate that other transitions (such as from (B) to (D)) are possible. Biologists can associate the stages with semantics relating to the age of the insects, such as "egg", "nymph", "adult", "empty pupae" (an insect has left the pupa and only the skin of the pupa is left), with semantics relating to life and death. As particular way to express stages is the "n1n2"/"n3n4" nomenclature, well known in the art.

Details for the appearance in each stage are well-known. Just to mention one point, insects can develop wings. For example, the presence or absence of wings can indicate particular development stage for thrips.

Below the stages, FIG. 4 illustrates a stage-to-species matrix, with stages (A) to (D) in columns, and insect species (i) and (ii) in rows.

In the example there are two species: (i) "whitefly" and (ii) "thrips". Insects of both species develop through the (A) to (D) stages (of course separately: (i) do not turn into (ii) or vice versa). The black dots at the column/row crossings indicate that insects of particular stage/species combinations should be counted. This is a compromise between accuracy (e.g. infestation critical for black dotted situations, but countermeasures available) and efforts (annotations, calculations, training etc.).

Rectangles group the particular stage/species combinations into classes (1) to (4) and thereby differentiate use cases 1 to 3.

For each particular use case, the following assumptions applies:

In the training phase **\*\*1, expert users 191** can annotate insects in the particular stage/species combinations on plant-images (or leaf-images) and the CNN can be trained with such annotations.

In the production phase, computer 202 with CNN 272 can count the insects accordingly.

The description explains use cases by example:

In use case 1, CNN 271/272 is trained to provide $N_{EST}$ as the number of species (i) insects in stages (B) and (C), without differentiating (B) and (C), that is $N_{EST}$ (i)(B)(C)

In use case 2, CNN 271/272 is trained to provide $N_{EST}$ in 2 separate numbers (cf. the introduction in FIGS. 1-2): $N_{EST}$ (ii) (B) and $N_{EST}$ (ii) (C)

In use case 3, CNN 271/272 is trained to provide $N_{EST}$ in 4 separate numbers: $N_{EST}$ (i) (A), $N_{EST}$ (i) (B), $N_{EST}$ (i) (C), and $N_{EST}$ (i) (D).

The rectangles are illustrated with class numbers (1) to (4), wherein the classes are just alternative notations. The description will explain adaptations to the CNNs for multi-class use cases (use cases 2 and 3) in connection with FIGS. 11-12.

Constraints Related to Insects

The description now refers to some challenges, but in combination with solution approaches.

The impact of the insects to the plant (as well as the appropriate countermeasures) can be different for each development stage. For example, it may be important to determine the number of nymphs (per leaf), the number of empty pupae and so on. Differentiating between young and old nymphs can indicate the time interval that has passed since the arrival of the insects, with the opportunity to fine-tune the countermeasure. For example, adults may lay eggs (and that should be prevented).

Figure 5:
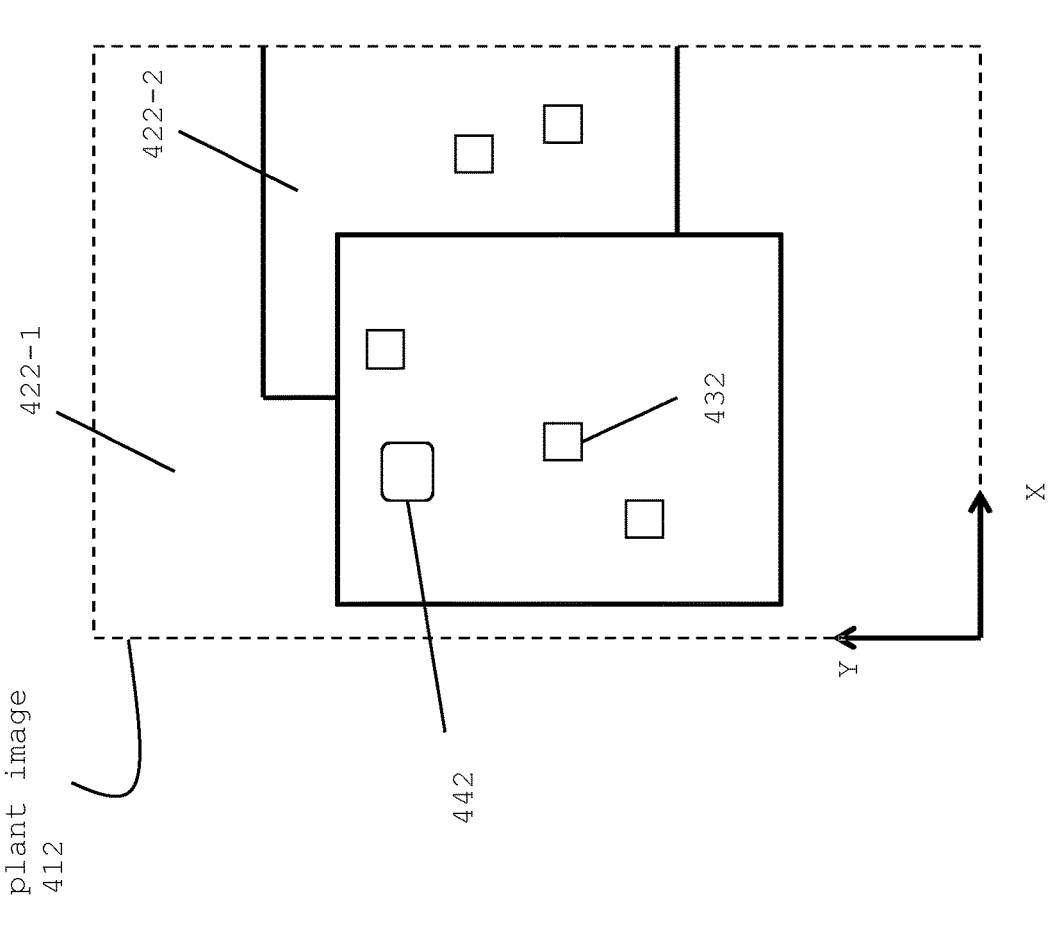
FIG. 5 illustrates a plant-image showing a particular plant with leaves and insects.
Figure 5:
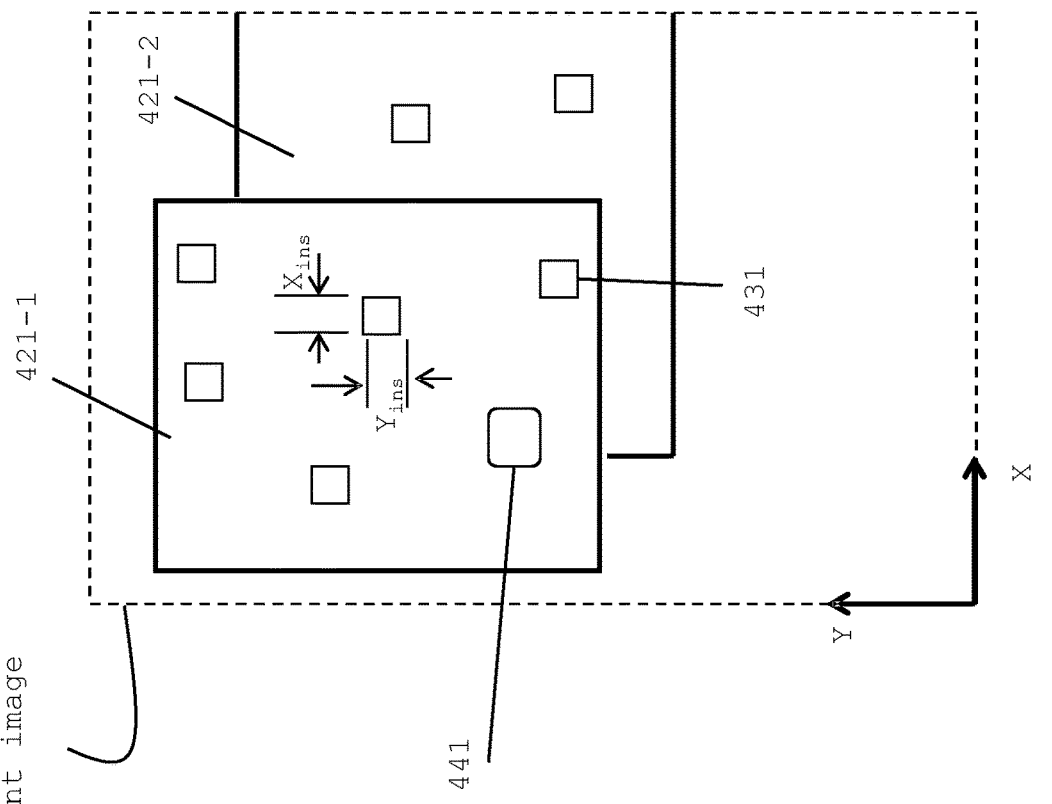

FIG. 5 illustrates plant-image 411/412 (dashed frame, cf. FIGS. 1-2). Plant-image 411/412 shows a particular plant with leaves 421/422 and with insects 431/432. FIG. 5 is simplified and uses symbols for the leaves (without illustrating the characteristic leaf shape). Leaf 421-1 corresponds to leaf 121-1 (of FIG. 1) and leaf 421-2 corresponds to leaf 121-2 (of FIG. 1), illustrated partly. Leaf 422-1 corresponds to leaf 122-1 (of FIG. 1) and the leaf 422-2 corresponds to leaf 122-2 (of FIG. 2), illustrated partly as well.

FIG. 5 illustrates insects 431/432 by small squares, there are some of them on leaf 421-1/422-1 and some of them on leaf 421-2/422-2. Non-insect object 441/442 is symbolized by a small square with round corners. Although not illustrated here by the symbols in this figure, the insects can belong to different classes (cf. FIG. 4).

It is noted that the spatial arrangement (i.e. pixel coordinates (X, Y)) of the leaves, the insects and the non-insect objects is different from image to image. The reason is simple: the images show different physical plants (even taken at different time points).

The description uses terms such as "insect 431/432" and "non-insect object 441/442" for convenience of explanation. It is however noted that FIG. 5 illustrates an image (being a data-structure) so that "insect 431/432" actually symbolizes the pixels that show the insect (likewise for 441/442).

For use in training phase **\*\*1, plant-image 411 (cf. FIG. 1**) can be taken by a high-resolution camera (e.g., 24 mega pixel) or by a main camera of a mobile device.

Although illustrated here as a single image, in training phase **\*\*1**, images are taken in pluralities. It is noted that the variety of different cameras can be taken into account when taking images for training.

In the production phase, plant-image 412 is usually taken by camera 312 of mobile device 302 (cf. FIG. 2). FIG. 5 is also convenient to explain constraints that arise from the objects (i.e., plants with leaves and insects) and from insufficiencies of mobile device cameras.

FIG. 5 illustrates image 411/412 in portrait orientation (height larger than width), this is convenient but not required. Image coordinates (X, Y) to identify particular pixels are given for convenience. Image dimensions are discussed in terms of pixels. For example, image 411/412 can have 6000 pixels in the Y coordinate, and 4000 pixels in the X coordinate (i.e. 24 Mega Pixels, or "24 M"). The pixel numbers are the property of the camera sensor and can vary.

Image 411/412 is usually a three-channel color image, with the color usually coded in the RGB color space (i.e., red, green and blue).

It is noted that image 412 does not have to be displayed to field user 192. Also, the field scenario will be explained for a single image 412, but in practice it might be advisable for field user 192 to take a couple of similar images 412.

Image 412 represents reality (i.e. plant 112, leaves 122, insects 132, non-insect objects 142), but with at least the following further constraints.

As mentioned already, plant 111/112 has multiple leaves at separate physical locations. Therefore in image 411/412, one leaf can overlay other leaves. Or in other words, while in reality (cf. FIG. 1), leaves are separate, leaf 421-1 and leaf 421-2 appear as adjacent leaves (422-1 and 422-2 as well).

However, with the goal to count N as "insect in a particular class per leaf", the overlay must be considered. As multiple leaves have similar color (usually, green color), their representations in plant-image 411/412 appear in the same color (i.e., small or zero color difference in the image).

Further, each insect of a particular class has a particular color. This color could be called text-book color, or standard color. For example, as the name suggests, an adult whitefly is white (at least in most parts).

However, the image would not properly represent the text-book color. There are at least the following reasons for that: (i) The color of the insect has a natural variability. (ii) The illumination can be different (e.g., cloudy sky, sunny sky, shadow and so on). (iii) Camera 311/312 is not an ideal camera. It does not take such different illumination conditions into account. As a consequence, the images may not properly show the color.

In the coding of the image (the numerical values that represent color, e.g., in the mentioned RGB space), the numerical values would be different. Therefore, the absolute value (of the color) in the image is therefore NOT particular characterizing.

Due to the mentioned camouflage, it can be complicated to differentiate insect 131/132 from non-insect object 141/142. This is complicated in nature and even more complicated in images.

Further, insects can be relatively tiny in comparison to the leaves. For example, an insect can be smaller than one millimeter in length. In contrast to the emphasis in FIGS. 1-2, a couple of hundred insects may occupy a single leaf easily. The insects are also usually relative tiny things for the human eye to detect. This is in sharp contrast to, for example, a single bee in the petal leaves of a flower.

FIG. 5 symbolizes the dimensions of insects 431/432. For example, an insect is shown by approximately $Y_{ins}=30$ pixels and approximately $X_{ins}=20$ pixels (i.e., approximately 600 pixels only).

Further, it is natural behavior of the insects to sit on the leaf close to each other. In other words, insects tend to be present on the leaf in pairs (i.e., two insects), or even in triples (i.e., three insects). So in other words, a 30×20 pixel portion of image 411/412 might represent two or more insects.

The pixel numbers 20×30 are exemplary numbers, but it can be assumed that insects 431/432 are dimensioned with two-digit pixel numbers (i.e. up to 99 pixels in each of the two coordinates). The same limitations can be true for non-insect objects 441/442.

As it will be explained, CNNs 271/272 (to count insects) use density map estimation (instead of the above-mentioned traditional object detection). In density maps, insects would be represented as areas, and the integral of the pixel values of the area would be approximately 1 (assuming that the pixel values are real numbers, normalized between 0 and 1, and also assuming to have one insect per map). It is noted that for situations in that two insects are located close together and overlapping on the image, there would be a single area, but the sum of the pixel values would be approximately 2.

It is noted that insects of two or more stages can be available on a single leaf at the same time. It is a constraint that the differences between two stages can be subtle. For example, on a leaf in reality, insects in stages (C) and (D) may look similar.

As a consequence, a computer using a conventional computer-vision technique (such as the mentioned technique with feature extraction) may not recognize the differences. However, an expert user can see differences (on images), and training images can be properly annotated (cf. use case 1).

Constraints Related to Mobile Devices

There are also constraints related to mobile device 302 (cf. FIG. 1).

First, mobile devices (and their camera optics) are optimized to take photos of humans, not of insects. The tiny insects appear on the image as spots (cf. $X_{ins}$ pixel×$Y_{ins}$ pixel).

Second, today's mobile devices may not have sufficient computing resources to perform image processing with the goal to count the insects per leaf.

Third, using mobile devices for obtaining annotated images and in the function of computer 201 (cf. FIG. 1) is potentially not suitable. The display of computer 302 (if a mobile device) might be too small and the processing power (in terms of CPU, GPU) might be insufficient.

Further, the farmer (i.e. the user of the mobile device) requires a result shortly after taking the image. To be more accurate: the time interval from taking the image to determining the insect-number-per-leaf must be negligible so that the insects do not substantially grow (and/or reproduce, and/or eventually change progress to the next development stage) during that time interval, the insects do no fly away (because the measures are applied to the infested plants).

The identification and the application of the countermeasures can only start when the insect-number-per-lead has been established. A countermeasure—although properly identified—may be applied too late to be effective. For example, a countermeasure that is specialized to destroy eggs would not have any effect if the insects have already hatched from the eggs (cf. stage specific countermeasures).

The following is taken into account by the solution. The species of the plant is usually known (for example, the farmer knows eggplant) so that the computer has the information (as an attribute of the image). Therefore, the plant species is therefore not further discussed here.

Annotating Images as a Pre-Processing Activity

FIG. 6 illustrates a user interface of computer 301 (cf. FIG. 1). FIG. 6 also illustrates expert user 191 annotating images. Thereby, FIG. 6 explains some of the pre-processing activities (cf. FIG. 3, 601A and 701A) in training phase **\*\*1. In other words, FIG. 6** is related to supervised learning.

Those of skill in the art can implement the interaction between computer 301 and expert user 191 by appropriate user interfaces, for example with a display showing images and with interface elements to identify parts of the image (e.g., touch-screen, mouse, keyboard etc.). Software tools for such and other annotations are known in the art. A convenient tool "LabelMe" is described by Russel, B. C., Torralba, A., Murphy, K. P., Freeman, W. T., 2008. 2008 LabelMe. Int. J. Comput. Vis. 77, 157-173. doi:10.5591/978-1-57735-516-8/IJCA111-407.

FIG. 6 gives more details how to obtain annotated images 461, 471 introduced above in connection with FIGS. 1-3. The coordinate system (X, Y) is given for convenience (cf. FIG. 5).

Expert user 191 conveys ground truth information to the images, not only regarding the presence or absence of a main leaf (by the leaf-annotations), or the presence or absences of particular insects (by the insect-annotations), but also information regarding the position of the main leaf and of the insect in terms of (X, Y) coordinates. Depending on the selected granularity of the use cases (cf. FIG. 4), the annotations can also identify insect species, development stages and so on.

Both annotation processes (leaf annotations, insect annotations) can be performed independently, and even the expertise of user 191 can be different. For both stages, user 191 rather assumes particular roles:

the role of a plant expert who can read images to recognize leaves with their borders (i.e., the border being the outline along the margin of a leaf that is shown on the plant-image completely), and the role of an insect expert who can read images to differentiate insects (and/or non-insects) according to classes.

Although FIG. 6 illustrates single image 411, annotating is repeated, for example for 1.947 images (leaf annotation). In view of that number, it is noted that expert user 191 is not necessarily always the same person.

The description now explains details for each type of annotation separately:

Leaf Annotation (by Human Experts)

As illustrated on the left side of FIG. 6, expert user 191 annotates plant-image 411 to obtain leaf-annotated plant-image 461. The leaf-annotation identifies the leaf border of the main leaf 421-1 in difference to adjacent leaf 421-2.

The leaf-annotation can also identify the border between leaf and background (or soil, if visible on the image). In other words, leaf-annotated plant images show annotated borders between leaf and background, and between leaf and leaf.

In implementations, user 191 can draw polygon 451 (dashed line) around that part of plant-image 411 that shows the complete leaf (i.e. the main leaf). In the example, image 411 shows leaf 420-1 as the complete leaf, and shows leaf 420-2 only partially, cf. FIG. 5. It is convenient to display polygon 451 to expert user 191, but this is not required. Computer 301 can close polygon 451 automatically. Instead of polygons, the person of skill in the art can use other user interfaces, for example picture processing tools to manipulate images, for example, by "erasing" the pixels surrounding the main leaf.

The leaf-annotation allows computer 201 (cf. FIG. 1) for each pixel of plant-image 411 to differentiate if the pixel belongs to the main leaf or not. This differentiation is relevant for performing method 601B (cf. FIG. 3, leaf segmentation).

For the leaf-annotation, it does not matter if the leaf shows insects (or non-insect objects).

The leaf-annotation allows the CNN being trained to differentiate image regions that show two types of "borders": between leaf and leaf, and between leaf and background (such as soil). Once trained, the CNN can but the leaf along such borders. In other words, the borders (or margins) stand for a cutting line.

Insect Annotation

As illustrated on the right side of FIG. 6, user 191 also annotates leaf-image 421 (cf. FIG. 7) to obtain insect-annotated leaf-image 471. The insect annotation identifies insects and—optionally—identifies insect classes (cf. species and/or stages, as explained by the classes in FIG. 4). The term "insect-annotated" is simplified: image 471 can comprise annotations for the non-insect objects are well.

The insect annotation also identifies the position of the insects (and/or non-insect objects) by coordinates.

It is noted that the annotations can take the use cases (cf. FIG. 4) into account. In the example of FIG. 6 (right side), the annotations are illustrated by dots with references $\alpha$ to $\zeta$, with—for example annotation $\alpha$ pointing to a whitefly (i) in stage (C); annotation $\beta$ pointing to a whitefly (i) in stage (B); annotations $\gamma$ and $\delta$ pointing to whiteflies (i) in stage (B); annotation E pointing to a non-insect object, being an optional annotation; and annotation pointing to thrips (ii) in stage (B), but differentiating stages would also be possible.

Expert user 191 can actually set the dots next (or above) to the insects. As used herein, a single dot points to a particular single pixel (the "dot pixel" or "annotation pixel"). The coordinate of that single pixel at position coordinate (X', Y') of an insect (or non-insect object) is communicated to computer 301. FIG. 6 illustrates the position coordinate for annotation β, by way of example. The user interface can display the dot by multiple pixels, but the position is recorded by the coordinates at pixel accuracy.

Computer 301 stores the position coordinates as part of the annotation. Coordinates (X', Y') can be regarded as annotation coordinates, and the computer would also store the semantic, such as (i)(C) in annotation 1, as (i)(B) in annotation β and so on.

As it will be explained further, the insect-annotation (for a particular image 411) is used by computer 201 in training CNN 271, for example, by letting the computer convolute images (i.e., tiles of images) with kernel functions that are centered at the position coordinate (X', Y'). Also, the insect-annotation comprises ground truth data regarding the number of insects (optionally in the granularity of the use cases of FIG. 4).

The annotations can be embedded in an annotated image by dots (in color-coding, e.g. red for stage (C), stage (D), or as X, Y coordinates separately.

Using dot annotations is convenient, because the (X, Y) coordinates of the annotations indicate where the insects are shown on the image.

Leaf-Images

Figure 7:
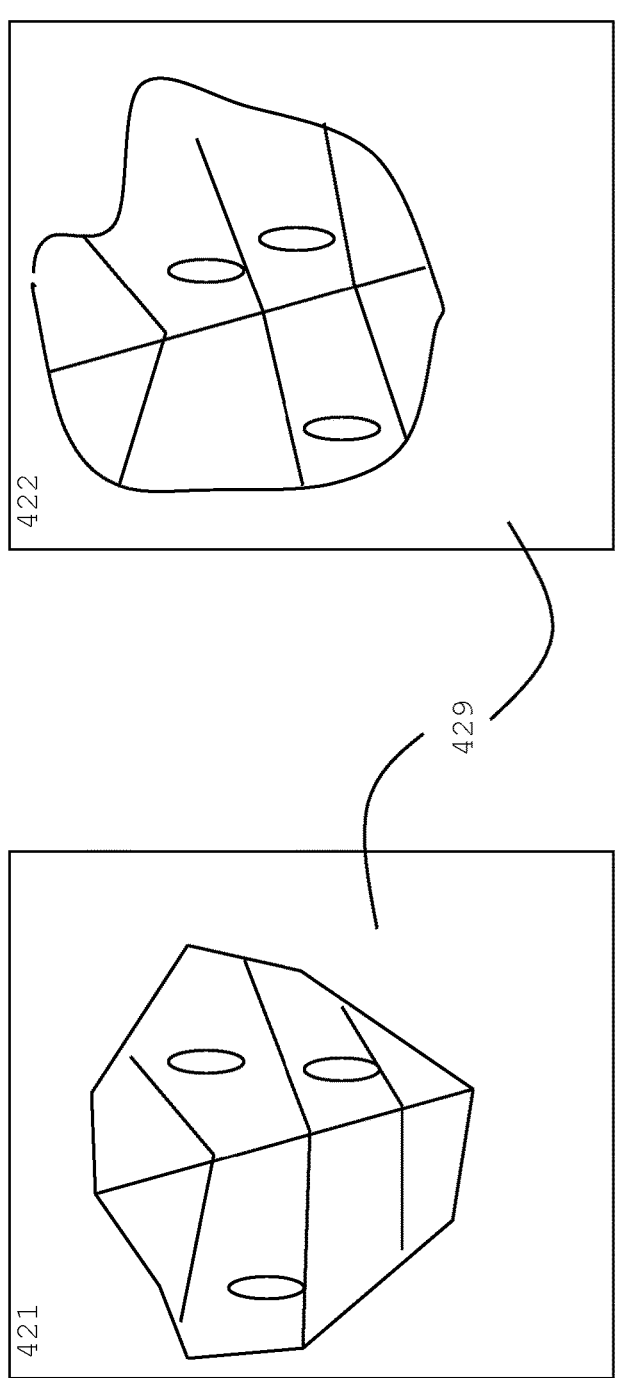
FIG. 7 illustrates a leaf-image.

FIG. 7 illustrates leaf-image 421/422. Leaf-image 421/422 shows a particular plant with its main leaf and with insects. In difference to plant-image 411/412, leaf-image 421/422 only shows the main leaf, but not the adjacent leaves. The main leaf is the object of interest. Leaf-image 421/422 shows the leaf substantially completely (because the insects are to be counted per leaf), and therefore the margin of the leaf is shown substantially completely as well. In that sense, leaf-image 421/422 is a cropped image derived from plant-image 411/412. The image is cropped to the leaf.

The way to obtain leaf-image 421 and 422 can differ, as described in the following:

In training phase **1, computer 201 obtains leaf-image 421 through interaction with expert user 191, as explained below (cf. FIG. 6, left side). Leaf-image 421 can be considered as the portion of leaf-annotated plant-image 461 that shows the leaf. Leaf-image 421 is illustrated here for explanation only. As explained in connection with FIG. 3, computer 201 processes the plurality of leaf-annotated plant-images 461 to obtain CNN 262, this process uses the annotations.

In the production phase, computer 202 obtains leaf-image 422 through segmenting plant-image 412 by using (trained) CNN 262 (in method 602B). In the production phase, annotations are not available. It is noted that leaf-image 422 (production phase) is not the same as leaf-image 421 (training phase).

Reference 429 illustrates portions of leaf-image 421/422 that do not show the main leaf. The pixels in portions 429 can be ignored in subsequence processing steps. For example, a processing step by that an image is split into tiles does not have to be performed for portions 429 (because insects are not to be counted according to the insects per leaf definition). In implementations, these portions 429 can be represented by pixels having a particular color or otherwise. In illustrations (or optionally in displaying portions 429 to users), the portions can be for example displayed in black or white or other single-color (e.g., white as in FIG. 7).

Splitting and Re-Combining Images

Figure 8:
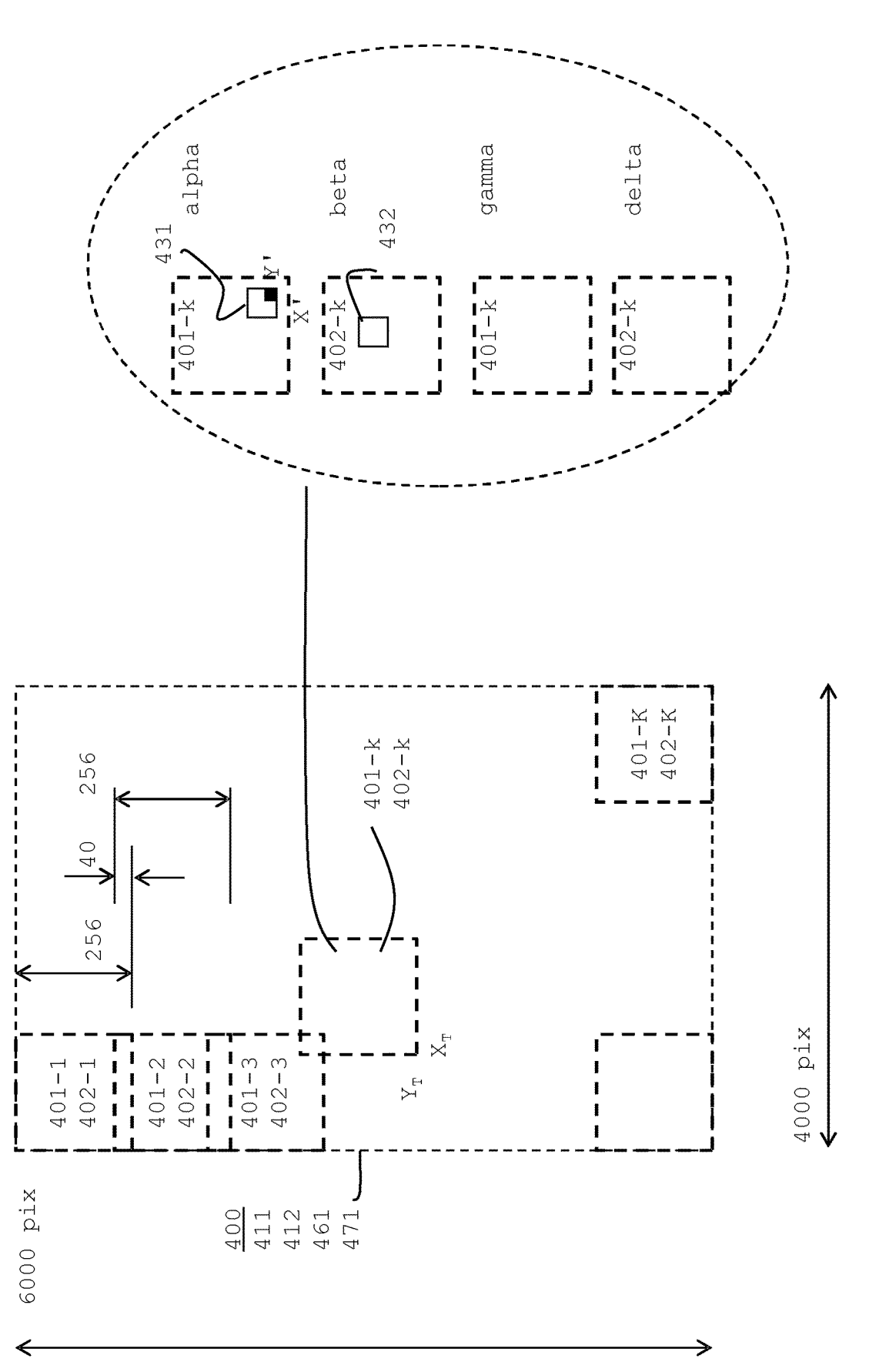
FIG. 8 illustrates an image being split into tiles or sub-regions.

FIG. 8 illustrates image 401/402 being split into tiles 401-k/402-k (or sub-regions). The image can be plant-image 411 (training phase), annotated as image 461 or as image 471, leading to tiles 401-k, or plant-image 412 (production phase), leading to tiles 402-k.

The number of tiles 401-k/402-k in image 401/402 is given be reference K. In the example, image 400 can have an image dimension of 4000×6000 pixels (annotations do not change the dimension). The tiles have tile dimensions that are smaller than the image dimensions. For example, the tile dimension is 256×256 pixels. The tile dimensions correspond to the dimension of the input layer of the CNNs (cf. FIG. 10). Other tile/input dimensions are also possible (e.g., 224×224 pixels). Taking overlap into account (e.g., overlap by 40 pixels, as illustrated), the number of tiles can be up to K=396.

The figure illustrates particular tiles 401-k/402-k in a close-up view on the right side, with examples:

In the example alpha, tile 401-k was split out from annotated image 471. Therefore, annotations are applicable for tile 401-k as well. For example, if an annotation indicates the presence of insect 431 for a particular (X', Y') coordinate, tile 401-k comprises the pixel with that particular coordinate and tile 401-k takes over this annotation (cf. the dot symbol, with position coordinates (X', Y') cf. FIG. 6). The person of skill in the art can consider the different coordinate bases (cf. FIG. 6 for the complete image, FIG. 8 for a tile only).

During training, CNN 271 would learn parameters to obtain density map 501-k with the integral summing up to 1 (corresponding to 1 insect, assuming normalization of the pixel values in the density maps). For example, CNN 271 would take the position coordinate (X', Y') to be the center for applying a kernel function to all pixels of tile 401-k.

In the example beta, tile 402-k was split from image 412 (production phase), it shows insect 432. Of course, the insect is not necessarily at the same position as in "annotated" tile 401-k above in alpha). Using the learned parameters, CNN 272 would arrive at density map 502-k with integral 1.

The example gamma is a variation of the example alpha. Tile 401-k was split up, and annotations are de facto available as well. Although expert user 192 did not provide annotations (dots or the like), the meta-data indicates the absence of an insect. During training, CNN 271 would learn parameters to obtain density map 501-k with the integral summing up to 0.

The example delta is a variation of case beta. A non-insect tile 402-k is processed in the production phase (by CNN 272) and it would arrive at a density map with integral 0.

It is noted that—in the production phase—the density maps are provided for all tiles 402-k (k=1 to K). The person of skill in the art can implement this, for example, by operating CNN 272 in K repetitions (i.e. one run per tile), and combiner module 282 can reconstruct the density maps of the tiles in the same order as splitter module 242 has split them (cf. FIG. 9 for the modules).

Taking the Use Cases and the Classes into Account

While in FIG. 8, the examples alpha to gamma are explained to detect the presence (or absence) of insects (in tiles), the classes (introduced above) can be taken into account as well.

As explained above, expert user 192 can annotate images for different insect species (e.g., (i) and (ii)), development stages (for example (A) to (B), at least for the combinations highlighted in FIG. 4 with the black dots. Therefore, there can be specific tiles 401-*k* for specific use cases.

Taking use case 3 as an example, there can be annotations for (i) (A), (i) (B), (i) (C), and (i) (D) (i.e. whitefly in four stages, classes (1) to (4)). In other words, the annotations are class specific.

This leads to different tiles 401-*k* for these combinations (or classes). Density maps 501-*k* (training phase) and 502-*k* (production phase) are different as well, simply because images 411/412 are different. The integrals can be separately calculated for different insect classes, resulting in the $N_{EST}$ (for the complete image, after combination) specific for the classes (cf. FIGS. 11-12).

Figure 9:
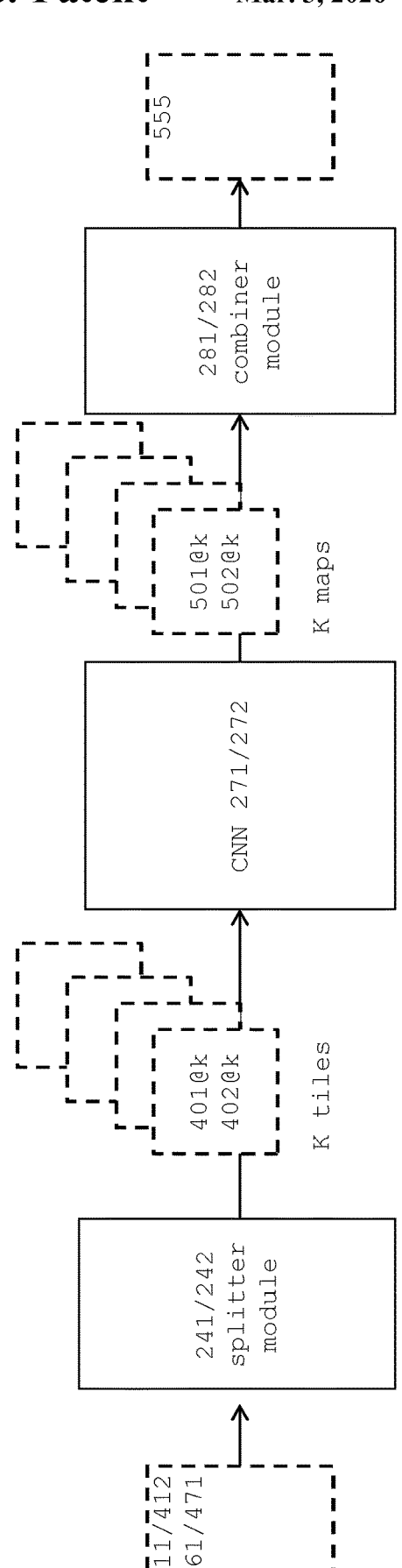
FIG. 9 illustrates a CNN with a splitter module at its input and with a combiner module at its output.

FIG. 9 illustrates CNN 271/272 with splitter module 241/242 and with combiner module 281/282.

Splitter module 241/242 receives images 411/412 (images 411 with annotations as images 461, 471) and provides tiles 401-*k*/402-*k*. As it will be explained, the CNNs provide density maps, combiner module 281/282 receives maps 501-*k*/502-*k* and provides combined density map 555.

Since there is an overlap (cf. FIG. 8), combiner module 281/282 can compose the image (or combined density map) by overlapping likewise. Pixel values at the same particular coordinate (X, Y coordinates for the 4000×6000 pixels) are counted only once.

Combiner module 281/282 can also calculate the overall integral of the pixel values (of the combined density map), thus resulting in $N_{EST}$.

CNN Overview

FIG. 10 illustrates CNNs 261/262/271/272 with layers, in a general overview. The CNNs are implemented by collections of program routines being executed by a computer such as by computer 201/202. FIG. 10 illustrates the CNNs with the input to an input layer and with the output from an output layer. FIG. 10 also illustrates (at least symbolically) intermediate layers. CNNs 261/262/271/272 are deep networks because they have multiple intermediate layers. The intermediate layers are hidden. In other words, deep learning is applied here.

FIG. 10 also illustrates some parameters and illustrates intermediate images (being tiles and maps). Since CNNs are well known in the art, the description focuses on the parameters that are applied specially for segmenting by CNNs 261/262 and for counting by CNNs 271/272.

As already mentioned in connection with FIGS. 1-2, the CNNs receive images as input.

In training phase \*\*1, CNNs 261/271 receive annotated images 461, 471 and turn un-trained CNN 261 into trained CNN 262 (using the leaf-annotated plant-images) and turn un-trained CNN 271 into trained CNN 272 (using insect-annotated leaf-images).

In the production phase, CNNs 262 and 272 receive plant-image 412 and provide output, such as $N_{EST}$ (i.e. the number of insects per leave).

The CNNs do not receive the images in the original image dimension (e.g., 4000×6000 pixels) but in tile/map dimensions (e.g., 224×224 pixels).

Density Map Calculation

During processing, the CNNs obtain intermediate data. For convenience, FIG. 10 illustrates an example for intermediate data by intermediate images: tile 401/402-*k* and density map 501-*k*/502-*k*. Index k is the tile index explained with FIGS. 8-9.

There is however no need to display the tiles and the maps to a user. FIG. 10 illustrates tile 402-*k* that shows two insects. Tile 402-*k* is a portion of a plant-image or a portion of a leaf-image and has tile dimensions optimized for processing by the CNN layers. In the example, tile 402-*k* has 256×256 pixels (or 224×224 pixels in a different example). Tile 402-*k* is obtained by splitting an image (details in connection with FIG. 8) to tiles.

Map 502-*k* is a density map derived from tile 402-*k*. Map 502-*k* has the same dimension as the tile 402-*k*. In other words, the map dimensions and the tile dimensions are corresponding to each other. The density map can be understood as a collection of single-color pixels in X-Y-coordinates, each having a numerical value V(X, Y). The integral of the values V of all X-Y-coordinates corresponds to the number of objects (i.e. insects). In the example, the integral is 2 (in an ideal case), corresponding to the number of insects (e.g., two insects shown in tile 402-*k*).

In the production phase \*\*2, map 502-*k* is obtained by prediction (with the parameters obtained during training). During the training phase \*\*2, one of the processing steps is the application of a kernel function (e.g., a Gaussian kernel) with the kernel center corresponding to an annotation coordinate (X', Y'), if an annotation (for an insect) is available in the particular tile 402-*k*. In other words, during training the tiles with annotations are processed to normalized Gaussians. In the absence of annotations, kernel functions are not applied.

Since tile 402-*k* is only a portion of the (complete) image (at the input of splitter 242), combiner module 282 (cf. FIG. 9) can sum up the integrals for the plurality of maps 502-*k*, leading to $N_{EST}$. Image overlap can be considered.

Converting tile 401-*k* to map 501-*k* is based on layer-specific parameters obtained by training (i.e., training CNN 271 to become CNN 272). Since the insect-annotations (cf. FIG. 6) indicate the presence (or absence) of an insect (or more insects as here), the annotations are also applicable to the (plurality of tiles). There are tiles with annotations (insects are present) and there are tiles without annotations (insects are not present).

In the example, tile 401-*k* has the annotation "2 insects". It is noted that both insects can belong to different classes (cf. FIG. 4), the differentiation between classes (i.e. counting the insects in a class-specific approach) is explained in connection with class-branching (cf. FIGS. 11-12).

Networks are publicly available in a variety of implementations, and the networks are configured by configuration parameters.

The description shortly refers to input/output parameters in general as well as to configuration parameter (in connection with FIG. 10) and then specifies parameters in view of the approach to count insects. Occasionally, an existing network is being modified.

Types

Exemplary networks comprise the following network types (or "architectures"):

(i) The UNet type is disclosed by Ronneberger, O., Fischer, P., Brox, T., 2015. U-net: Convolutional networks for biomedical image segmentation, in: Lecture Notes in Computer Science (Including Subseries Lecture Notes in Artificial Intelligence and Lecture Notes in Bioinformatics). pp. 234-241. doi:10.1007/978-3-319-24574-4_28

(ii) The DenseNet type is disclosed by Huang, G., Liu, Z., Van Der Maaten, L., Weinberger, K. Q., 2017. Densely connected convolutional networks, in: Proceedings—30th IEEE Conference on Computer Vision and Pattern Recognition, CVPR 2017. pp. 2261-2269. doi:10.1109/CVPR.2017.243

(iii) The Fully Convolutional Regression Network (FCRN) type is disclosed by Xie, W., Noble, J. A., Zisserman, A., Xie, W., Noble, J. A., Microscopy, A. Z., 2016.

Computer Methods in Biomechanics and Biomedical Engineering: Imaging & Visualization Microscopy cell counting and detection with fully convolutional regression networks ABSTRACT. Comput. Methods Biomech. Biomed. Eng. IMaging Vis. 1163. doi:10.1080/21681163.2016.1149104

The modified FCRN type is based on the FCRN type, with modifications.

The CNNs have the following properties:

(i) It is a fully convolutional model, being able to provide semantic segmentation in combination with pixel-by-pixel regression.

(ii) From the many functions of a CNN, the regression function is used during training to minimize the difference between the ground truth (i.e., number of insects according to annotations) and the number or insects estimated (i.e. $N_{EST}$). In other words, the difference is the loss function. Regression is known in the art and will be explained by example in FIG. 13.

(iii) The CNNs have been tested for implementations for the types UNet, DenseNet and FCRN (with modifications).

The following particulars are introduced (or used) by setting parameters accordingly (skilled person): (i) The last layer is an activation of the linear type. (ii) The loss function is selected to be the mean absolute error (MAE).

The FCRN network (by Xie et al) was modified by the following:

(i) Using dropout: During training, a layer is selected from that a given number of neuron nodes are excluded at random from further calculation. The number of such excluded neurons is pre-defined, for example by a percentage (i.e., a dropout parameter).

(ii) Using two additional layers to an encoding part (i.e., an encoder), and using two additional layers in a corresponding decoding part (i.e. a decoder): The additional layers are added by means of up-sampling procedures. The additional layers implement filter function and encoding/decoding functions with further explanations in FIGS. 11A and 11B.

(iii) Last layer activation, loss function, output channel and branches have been added for use cases with multiple classes (cf. FIG. 4, use cases 2 and 3). This will be explained with more detail in connection with FIGS. 11AB and FIG. 12.

Also (for all 3 network types), the following parameter settings are useful:

The convolutional neural networks (as disclosed in the mentioned papers) usually apply global average pooling (GAP) and/or fully connected (FC) layers at their CN backends, but it may be advantageous to replace GAP by global sum pooling (GSP). GSP allows CNNs to learn counting as a simple linear mapping problem that is generalized over the input shape (e.g., of an insect).

Convenient parameters are also the following:

(i) Class parameters. Depending on the use case (cf. FIG. 4), the input and output is differentiated into insect classes. As the classes are known in advance (i.e. prior to operating the CNN), the CNN learns different parameters for different classes (in the training phase) and applies different parameters for different classes (in the production phase). Details are explained in connection with FIGS. 11-12.

(ii) Function parameters indicate the type of operation that the CNN has to apply. For example, function parameters can trigger the CNN to estimate density maps (e.g., sum of pixel values indicate the number of objects/insects), to perform particular pre-processing (e.g., to apply Gaussian around a centroid to obtain a kernel) and others.

(iii) The input size parameter (i.e., input dimension) defines the tile dimension of a tile that is being processed. For example, the input dimension is a tile (or "patch") of 256×256 pixels (cf. the discussion regarding tiles, in FIG. 9).

(iv) The learning rate parameter can conveniently be set to $I_r$=0.01. The rate influences the speed (and thereby the duration of the training).

(v) The sigma parameter σ (sigma) is a parameter of the Gaussian kernel (used in the training phase). For example, the parameter can be set to σ=9.

(vi) Parameter 12 is a weight decay parameter to reduce overfitting is conveniently set to $I_2=10^{-5}$.

(vii) Using dropout is optional; a convenient dropout parameter is 0.5.

(viii) Activation parameters indicate the type of activation functions, such as sigmoid or softmax (i.e., normalized exponential function) or others.

(ix) Loss function parameters are used to optimize the CNN for accuracy. For example, the loss function parameter indicates the difference between the ground truth and the estimation (e.g., number of insects on a leaf manually counted through annotations vs the number of insects estimated by the CNN). Loss functions can be defined, for example, by mean functions.

Auxiliary parameters can be used to deal with technical limitations of the computers. For example, computer 201/202 that implements the CNNs may use floating point numbers, with a maximum highest number of 65536. However, numerical values that the CNN uses to decide for activation (non-activation) could be in the range between 0.0000 and 0.0067 (e.g., in Gaussian kernel with σ=9).

It may be problematic that CNN 271/272 is not capable of learning what information has to be learned. This is because the contrast (in a density map) between insect (pixel activation of 0.0067) and "no insect" (pixel activation of 0.00) is relatively small. Applying a scale factor increases the contrast in the density maps, and eases the density map estimations (i.e., with integrals over images indicating the number of objects). The scale factor can be introduced as auxiliary parameter. For example, all pixel values may be multiplied by the factor 50.000 at the input, and all output values (i.e., insect counts) would be divided by that factor at the output. The factor just shifts the numerical value into a range in that the computer operates more accurately. The mentioned factor is given by way of example, the person of skill in the art can use a different one.

In implementations, CNN 261/262 (to detect leaves) is a CNN of the DenseNet type. For this purpose, the following parameters are convenient: The loss function can be a "binary_crossentropy" function. The activation of the last layer can use a "softmax" function. The tile dimensions (i.e. the dimensions of the input and output image) can be 224×224 pixels.

In implementations, CNN 271/272 (i.e. the CNN to detect insects) is a CNN of the FCRN type. For this purpose, the following parameters are convenient: The loss functions can be defined, for example, by means functions, such as Mean Absolute Error, or Mean Square Error. The tile dimensions can be 256×256 pixels.

Filtering to Differentiate Classes

FIGS. 11A and 11B illustrate a pixel value filter that is implemented as part of a layer in CNN 271/272 in implementations that differentiate more than two insect classes (c). As explained above in connection with FIG. 4, the classes can be, for example (c)=(1), (2) for use case 2, or can be, for example, (c)=(1), (2), (3), (4) for use case 3.

While FIG. 11A focuses on a filter that takes individual pixels into account, FIG. 11B focuses on a filter that takes sets of adjacent pixels (or tile segments) into account. In other words, the filter can be applied to properties of individual pixels (in the example: the color, in FIG. 11A), and the filter can also be applied to properties of pixel pluralities (in the example: a texture made my multiple pixels, in the pixel-group filter of FIG. 11B).

Individual-Pixel Filter

On the left side, FIG. 11A illustrates tile 401-*k*/402-*k* as input tile, and on the right side, FIG. 11A illustrates 401-*k*/ 402-*k* as output tiles, differentiated for class (first) and for class (second).

Each tile should have pixels from p=1 to p=P. For tiles with 256×256 pixels, there are 65.536 pixels. The figure illustrates tiles with 12×12=144 pixels just for simplification.

Each pixel "pix" has a RGB triplet (r, g, b) that indicate the share of the primary colors. There are many notations available, for example each share could also be noted by an integer number (e.g. from 0 to 255 for each color in case of 8 bit coding per color).

The filter condition can be implemented, for example, such that pixels from the input are forwarded to the output if the pixel values comply with color parameters Red R(c), Green G(c) and Blue B(c). The conditions can be AND-related.

The color parameters are obtained by training (the insect classes annotated, as explained above).

Much simplified, in a hypothetical example, there should be insects of a first class (first) and of a second class (second). The insects in (first) should be "red", so that the parameters are R(first)>0.5, G(first)>0.0, and B(first)<0.5. An input pixel that complies with the condition is taken over as an output pixel. FIG. 11A symbolizes such a (c)=(first) insect at the left edge of the tile (with 3 pixel) that are taken over to the output tile (first).

The insects in the (second) class should be "blue", so that the parameters are R(first)<0.5, G(first)>0.0, and B(first) >0.5. Such an insect is illustrated at the lower part of the input tile, again here much simplified with 3 pixels.

An input pixel that complies with the condition (for class (second)) is taken over as an output pixel, and FIG. 11A symbolizes such a (c)=(second) insect with pixels (0.1, 0.8, 0.7), (0.2, 0.9, 0.6), (0.1, 0.5 0.8), that are taken over to the corresponding output tile.

It is noted that applying the filter is conveniently implemented as a convolutional layer in CNN 271/272 (the filter filtering tiles, cf. FIG. 11B), but the filter can also be implemented before the splitter module (cf. FIG. 9, the filter for pixels, cf. FIG. 11A).

The filter can be part of the processing channel of CNN 271/272 before the layer(s) that creates the density maps. Therefore, the density maps are class specific.

The color parameters Red R(c), Green G(c) and Blue B(c) are just examples for parameters that are related to pixels, but the person of skill in the art can use further parameters such as transparency (if coded in images) etc.

Pixel-Group Filter

FIG. 11B illustrates a pixel-group filter that takes neighboring (i.e. adjacent pixels) into account. As the pixel-group filter uses convolution, it is implemented within CNN 271/ 272 that processes tiles 401-*k*/401-*k* (i.e., after splitter module 241/242).

FIG. 11B repeats the much simplified "3-pixel-insect" from the left edge of FIG. 11A. The 12×12=144 pixel tile is separated into 4×4=16 segments (from #1 to #16). Each segment has 3×3 pixels, being a square segment.

The figure is simplified, but in implementations, the 256×256 tiles are separated into a different number of pixels, potentially having more pixels per segment.

Segment #10 is being convoluted (with a particular convolution variable, e.g., 3 pixels) to modified segment #10'. Thereby, the pixels values (of the 9 pixels) change.

For example, segment #10 can have the pixel values (1, 0, 1, 0, 1, 0, 0, 0, 0) and segment #10' can have pixel values (0.8, 0.1, 0.0, 0.1, 0.2, 0.7, 0.1, 0.7, 0.0). As FIG. 11B illustrates the pixels in "black" or "white" only, the pixels with values over 0.5 are illustrated "black".

Filter criteria can now be applied to the modified segment #10'. In this respect, FIG. 11B also illustrates a further implementation detail. The modified segments can be encoded in segment-specific values. The figure illustrates such values (by arbitrary numbers) "008", "999" and "008" for segments #1', #10' and #16', respectively. The filter criteria can then be applied to the segment-specific values.

In other words, CNN 271/272 can then perform subsequent processing steps by using the segment codes (the segment-specific values). This reduces the number of pixels to be processed (simplified, by a factor that corresponds to the number of pixels per segment, with 9 in the illustrative example). In one of the last layers, CNN 271/272 can then apply decoding.

FIG. 12 illustrates CNN 271/272 with branches for particular classes (1), (2), (3) and (4). As explained in connection with FIG. 6, the insect-annotations can specify the class (species and growing stage). Training the CNN is performed for channels (or branches) separately. In the example of FIG. 12 there are 4 channels corresponding to 4 classes.

The separation into class-specific layers (by a filter, such as explained in the example of FIG. 11) is illustrated here between internal layer 1 and internal layer 2 (that is provided in a plurality corresponding to the number of classes).

On the right side, FIG. 12 illustrates combined density maps that combiner 262 obtains by combining maps 502-1 to 502-K, separately for each branch to density maps 555(1), 555(2), 555(3) and 555(4). In the example, there are K=36 tiles combined (into one map 555), this number is just selected for simplicity.

Density maps 502 that indicate the presence of an insect (in the particular class) are illustrated with a dot. As in the example, density map 502-29 (in the example illustrated as the map with k=29) indicates an insect of class (1) and an insect of class (2).

In the simplified overview, there the overall integral (k=1 to K) for the combined density maps 555 leads to different estimations: $N_{EST}$ (1)=2, $N_{EST}$ (2)=3, $N_{EST}$ (1)=2, $N_{EST}$ (3)=2, and $N_{EST}$ (4)=7 (map 502-9 reflects 2 insects). The overall number of insect is $N_{EST}$ (1)(2)(3)(7)=14. The illustration of FIG. 12 is simplified in that individual pixels have binary values ("1" or "0"). The calculation by the CNN layers provides pixels with real values (i.e., "grayscale" values). Nevertheless, a cluster of pixels with, for example, 0.1, 0.1, 0.6, 0.1 and 0.1 sum up to an integral 1.

Providing infestation data separated for species and growing stage can be advantageous for the farmer to identify the appropriate countermeasures.

As training is separated for the classes, training is performed separately as well.

It is noted that the illustration as separate branches (i.e., in parallel) is convenient for explanation, but not required. Parallel processing is possible, but the channels can be implemented by serial processing as well. In other words, CNN 271 would be trained for insects in class (1), then for insects in class (2) and so on. In the production phase, CNN 272 would provide density maps for inspects of class (1), then of class (2) and so on.

Sets of Annotated Images for Specialized Purposes

The description now explains further details regarding the training phase **\*\*1 by that CNN 261 is enabled to segment leaves (by becoming CNN 271, method 601B) and enabled to count insects (by becoming CNN 272, method 701B**).

As explained above, in production phase **\*\*2, CNN 272 provides $N_{EST}$ (the estimated number of insects per leaf for particular plant-image 412) as the output. In an ideal situation, the combination of CNN 262 and CNN 272 would calculate $N_{EST}$ to be exactly the so-called ground truth number $N_{GT}$: here the number of insects sitting on the particular main leaf of the plant (from that farmer 192 has taken image 412). The difference between $N_{EST}$ and $N_{GT}$ would indicate how accurate camera 312 and CNNs 262/272** are performing.

Figure 13:
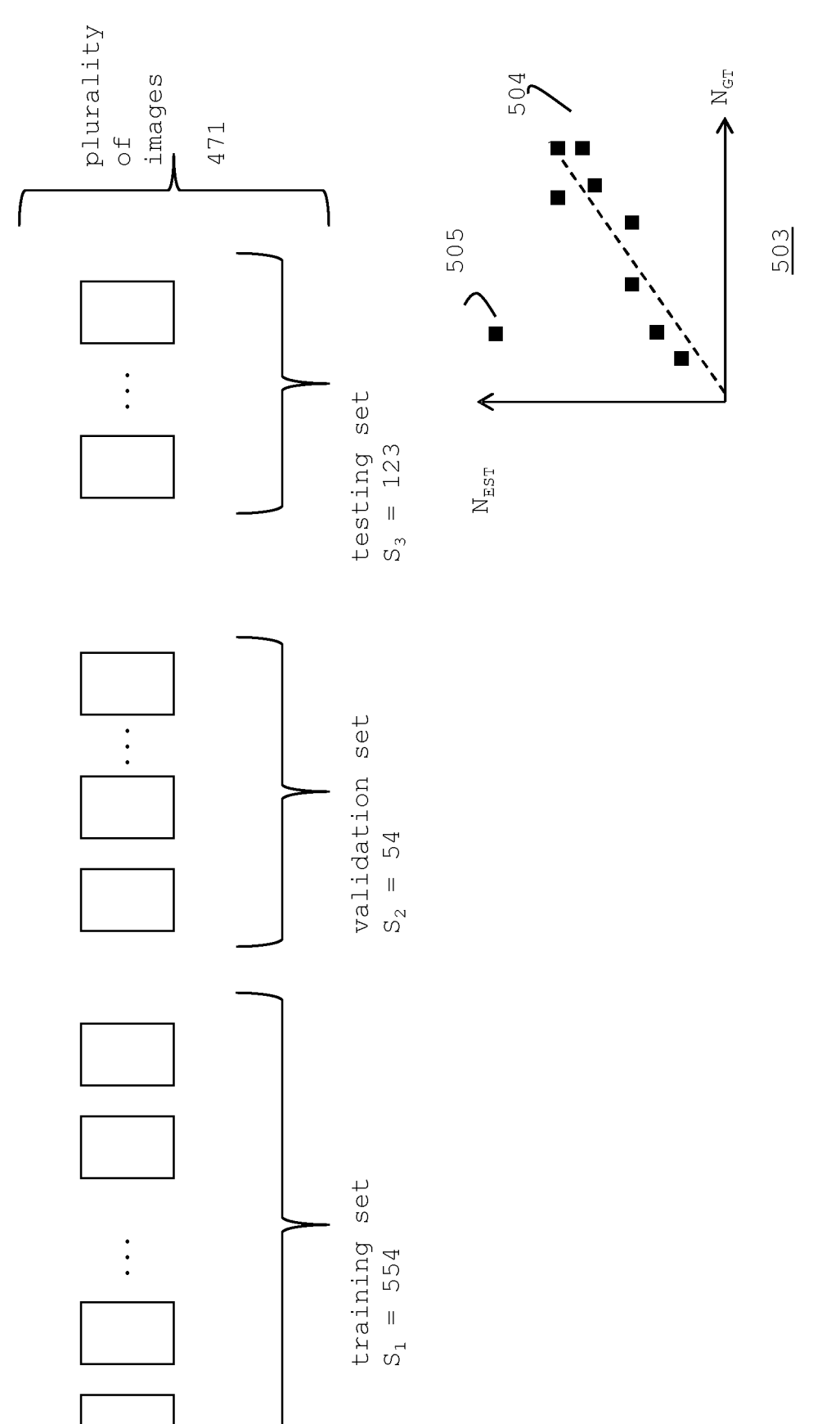
FIG. 13 illustrates a set of insect-annotated images, with sub-sets for training, for validating and for testing.

However, farmer 192 would not manually count the insects ($N_{GT}$). The description now explains how the accuracy of CNN 262/272 is validated. As insect-annotations identify insects (as leaf-annotations identify leaves), the ground truth numbers $N_{GT}$ are known for annotated images 471 already. That data is used as explained in the following:

FIG. 13 illustrates a set of insect-annotated images 472 (i.e., resulting from insect-annotations as in FIG. 6), with sub-sets: a sub-set for training CNN 271 (cf. FIG. 1), a sub-set for validating CNN 272 (cf. FIG. 2), and a sub-set for testing CNN 272.

The sub-sets have cardinalities $S_1$, $S_2$ and $S_3$, respectively. The number of insect-annotated images S is the sum of the subsets: $S=S_1+S_2+S_3$.

Differentiating images into sub-sets in known in the art. Therefore, FIG. 13 takes the insect-annotated leaf-images 471 as an example only. The person of skill in the art can fine-tune training CNN 271 for the leaf segmentation accordingly.

The cardinalities are specific to the cases (cf. FIG. 4), in the example of the case 1 (1 class), there are S=731 annotated images in total (i.e., insect-annotated leaf-images 471), with $S_1$=554 images in the training sub-set (i.e. images 471 to train CNN 271, cf. FIG. 1), $S_2$=54 in the validation sub-set, and $S_3$=123 images in the testing sub-set.

CNN 261/271 have been trained with the $S_1$ images of the training sub-set to become trained-CNN 262, 272 Trained-CNN 262, 272 have been used to estimate $N_{EST}$ for the $S_2$ images of the validation sub-set. The $S_2$ values $N_{GT}$ are known from the insect-annotations. If for a particular image, $N_{EST}$ is higher than $N_{GT}$ CNNs 262/272 have counted more insects that present in reality.

Below the testing sub-set, FIG. 13 illustrates a simplified graph 503 showing $N_{EST}$ on the ordinate versus ground truth $N_{GT}$ on the abscissa, with a dot identifying an ($N_{EST}$, $N_{GT}$) pair. Graph 503 is simplified in illustrating 9 dots only (instead of, for example, 54 or 123).

Most of the dots are located approximately along regression line 504. The (graphical) distance of a dot from line 504 indicates the quality of the estimation. Dot 505 stands for an outlier, with much more insects estimated than present.

A metric can be defined as Mean Absolute Error (MAE), or $MAE=N_{ESTs}-N_{GTs}$ (The formula given here is simplified, MAE is actually calculated as the sum is of the MAEs for s=1 to $S_3$ divided by $S_3$).

Since this is a mean value, $N_{EST}$ and $N_{GT}$ are obtained as the average of the $S_3$ images.

A further metric can be defined as Mean Square Error (MSE), or $MSE=ROOT [(N_{EST}-N_{GT})^2]$. Again, $N_{EST}$ AND $N_{GT}$ for all $S_3$ has to be taken into account (i.e. [ ] being the sum of ( )$^2$ for all $S_3$).

For case 1 (whitefly single class (1)), the set $S_3$ provided values MAE=3.4 and MSE=7.8. In comparison to a traditional approach (candidate selection with subsequent classification, MAE=8.6 and MSE=11.4), the error values are smaller. In other words, the error by the new approach is less than half of the error of the traditional error.

Discussion

Differentiating the main leaf from its adjacent leaves (or neighbor leaves) can be implemented by known methods as well (among them feature extraction). For leaves that are green over a non-green ground, color can be used as a differentiator. However, such an approach would eventually fail for "green" over "green" situations, for example, when one leaf overlaps another leaf.

In alternative implementations, counting insects can be implemented by other known approaches, such as by the above-mentioned candidate selection with subsequent classification.

However, both for leaf differentiation and for insect counting (at the main leaf), the above-described deep learning techniques provide accuracy (i.e., the terms of false positives, false negatives).

Overview to Computer-Made Annotations

Shortly returning to FIG. 1, it illustrates computer 303 as a further computing function.

The figures illustrates computers 301 and 303 in parallel, because both receive images and both provide annotated images. While computer 301 interacts with expert user 191, computer 303 performs computer-implemented method (800, cf. FIG. 18) without expert user 191. It is however possible to implement both computing functions 301/303 by a single physical computer.

It is noted that computer 303 (method 800) provides images 473 (insect-annotated, but not leaf-annotated). The images at the input of computer 303 are leaf-images (i.e., images that show the main leaf as explained above). The description explains approaches to obtain such leaf-images, for example, by using leaf segmentation 601A, or 601B (cf. the overview in FIG. 3).

As described above, insect-annotated leaf-images 471 are images with human-made annotations. As it will be described in the following, insect-annotated leaf-images 473 are images with computer-made annotations (method 800).

As it will be explained (with details in FIG. 19), there will be separate training, a first training branch uses images 471 and a second training branch uses images 473. In other words, there is a branch under "full supervision" and there is branch under "semi-supervision". The results of both branches can be compared (for example, by investigating the loss function) so that method 800 can be adjusted.

Training Phase Adaptation

Shortly returning to FIG. 3, the training phase (to train CNN 271 to CNN 272) is enhanced by method 800 that provide images 473 (that are used in addition to image 471, the first and second branches). Method 800 can be regarded as an auxiliary method.

As already explained, computer 301 interacts with expert user 191 to obtain insect-annotations, resulting in image 471. Further, computer 303—without interacting with the expert—provides insect-annotated plant images 473, being computer-annotated images.

Computer-Made Annotations

The description now turns back to computer 303 (FIG. 1) and to method 800 (FIGS. 3, 18) to explain the generation of images 473.

Cameras 311 and 312 (used in both phases, cf. FIGS. 1-2) are optimized to take images targeted for human viewers (e.g., photos that show people, pet animals, and/or buildings). The colors of the photos are optimized for the human eye. However, the images are not optimized to count insects on plants, not by human users, not by computers.

In monochrome photography it was common practice to use cameras with color filters, for example, to make clouds on the sky more attractive. However, using filters to make insects more discernible from leaves is not contemplated. Filtering is implemented in software.

Color-Coding

Figure 14:
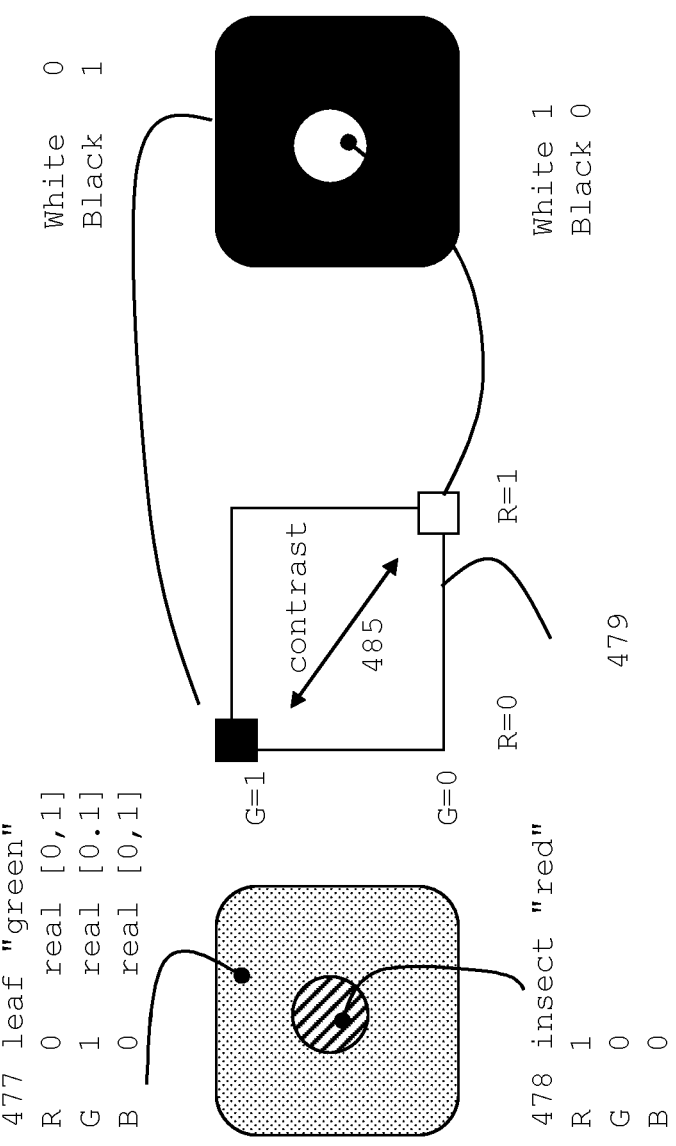
FIG. 14 illustrates pixel-by-pixel color-coding and illustrates the concept of assigning colors to binary pixel values.

FIG. 14 illustrates pixel-by-pixel color-coding and illustrates the concept of assigning pixel colors to binary pixel values. Much simplified, there should be a leaf (here symbolized by a large square) with an insect (symbolized by a circle in the center of the square).

There are two colors, for example, leaf pixels 477 (for the leaf) are "green" and insect pixels 478 (for the insect) are "red".

The quotations merely point to a simplification. The leaf pixels 477 and the insect pixels 478 are coded in a particular color-coding. The coding uses 3 components (i.e., a "color space").

The example uses RGB-coding in that the color components R, G and B are coded by real numbers (e.g., in closed intervals [0,1]). Leaf pixels 477 would be coded (R, G, B)=(0, 1, 0) and insect pixels 478 would be coded (R, G, B)=(1, 0, 0).

Disregarding the blue component, the (R, G, B) color space would be reduced to a (R, G) planar color space 479, with component values (0, 1) for pixels 477, and (1, 0) for pixels 478.

The description uses the term "space" in the mathematical sense. For 3 color components, the space would be a 3D space. Removing a component changes the 3D space to a 2D "plane" (i.e. flat surface in mathematical terms). Since the term "plane" is frequently used to describe technologies such image processing or printing, the description herein uses the term "planar color space".

According to these component values, the color of the pixels would be on opposite ends of planar color space 479, with an easy to differentiate contrast 485.

It would be relatively easy to assign the colors (R, G, B)/(R, G) to binary values. FIG. 14 illustrates binary values as components in "white" and "black", but there is no need to show images to a user.

For example, (R, G)=(0, 1) (upper left corner, "green") can be assigned to binary (0, 1); and (R, G)=(1, 0) can be assigned to binary (1, 0). Binary values differentiate the leaf from the insect.

However, insects are not "red" and they are not "white" (even if the name may suggest that). As insects tend to camouflage, they may be in colors that are similar to that of the leaf. It is noted that camouflage would be sensitive to the eyes of insect-eating birds (or the like) but not sensitive to human eyes and not sensitive to cameras 311/312 (cf. FIGS. 1-2).

The description now explains how a color-code change addresses this problem. The sensitivity (of the computer) to small color differences that are typical for leaf/insect images is thereby increased.

Color Space Transformation

Figure 15:
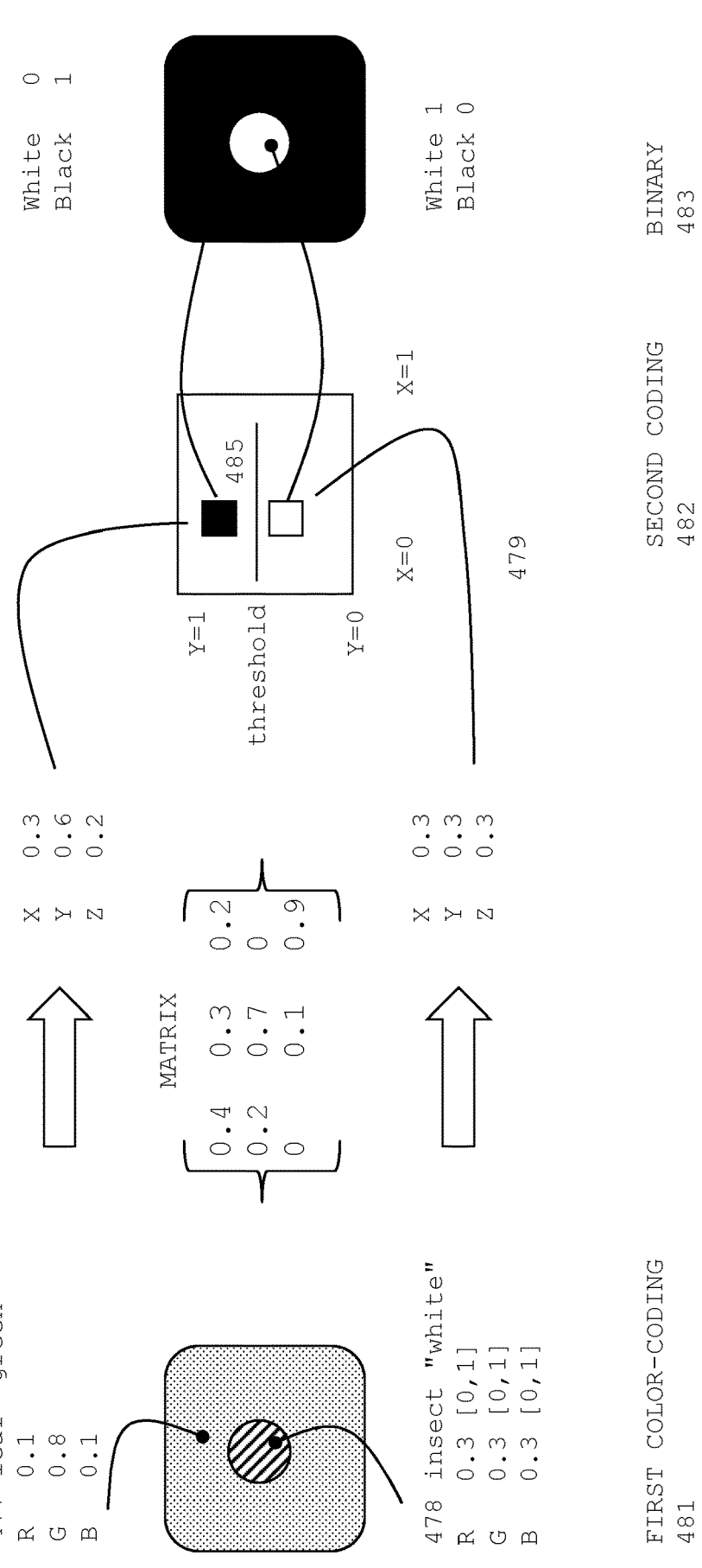
FIG. 15 illustrates pixel-by-pixel color-coding and assigning colors to binary pixel values, with changing the color-coding.

FIG. 15 illustrates pixel-by-pixel color-coding and assigning colors to binary pixel values, with changing the color-coding involving color space transformation and color clustering. The figure takes over the leaf/insect example of FIG. 14.

The image uses the same color space of FIG. 14 (left side, first color-coding 481). The actual components are slightly modified, just to have the example more realistic.

Leaf pixels 477 should be coded (R, G, B)=(0.1, 0.8, 0.1) and insect pixels 478 insect should be coded (R, G, B)=(0.3, 0.3, 0.3). It is fair to regard the leaf as "green" and the insect as "white".

This coding is first color-coding 481 (i.e. a coding in a color space), here again RGB-coding.

It is possible to change coding, from first color-coding 481 to second color-coding 482. In the example, the change comprises a space-transformation, and a subsequent space-to-plane reduction (i.e., 3D space to 2D planar space)

In the example, there is transformation from the (R, G, B) space to the (X, Y, Z) space. XYZ is a color space defined by CIE (Commission Internationale de l'Éclairage, International Commission on Illumination) in standards (ISO/CIE 11664-4:2019 Colorimetry). (The letters X, Y, Z are not identical with location coordinates).

The person of skill in the art can perform the transformation for example, by applying a standardized matrix multiplication: (X, Y, Z)=MATRIX*(R, G, B).

As an example of the transformation matrix is given in FIG. 15 (e.g. Z=0*R+0.2*G+0.9*B). The calculated (X, Y, Z) component vectors are given in the figure as well.

The subsequent space-to-planar-space reduction is simply performed by disregarding the Z-values. The Z-values for the leaf and for the insects are substantially equal. The Z-values do not substantially contribute to differentiating (leaf/insect).

Such a reduction from space (X, Y, Z) to planar space (X, Y) is similar to the space/planar-space reduction of FIG. 14. Likewise, the color-values (X, Y) can be illustrated in planar color space 479, and the line between both can be taken as threshold 485.

The (X, Y) color-coding is second color-coding 482.

In assigning the colors (R, G, B) to binary values (W, B), computer 303 can use threshold 485. For example, pixels with Y>=0.5 would be coded to (0, 1) and pixels with Y<0.5 would be coded to (1, 0). In the example, the pixel(s) above (or at) the threshold belong to a first color cluster, and the pixel(s) below the a second color cluster. Color clusters are explained with more detail in FIG. 16.

The coding change (transformation, reduction) enhances the contrast between the leaf and the insect parts and makes it easier to assign pixels to binary values. In the second color-coding, the leaf-insect contrast is higher (than in the first color-coding). In other words, the clusters are differentiated by color contrast.

It is advantageous that the change allows pixel comparison in terms of a planar color space (2D), but does not require the comparison in terms of a space (3D). This approach reduces computation complexity and reduces the use of computation resources such as CPU and memory.

It is noted that any non-standard transformation matrix as long as the transformation maximizes the contrast between specific elements in the image.

While FIG. 15 explains a simplified example with pixels in two colors, it is noted that images may have pixels in a couple of hundred component combinations. A human user may easily differentiate the colors into "green" or "white" colors, but computer 303 takes a different approach.

Color Clustering

Figure 16:
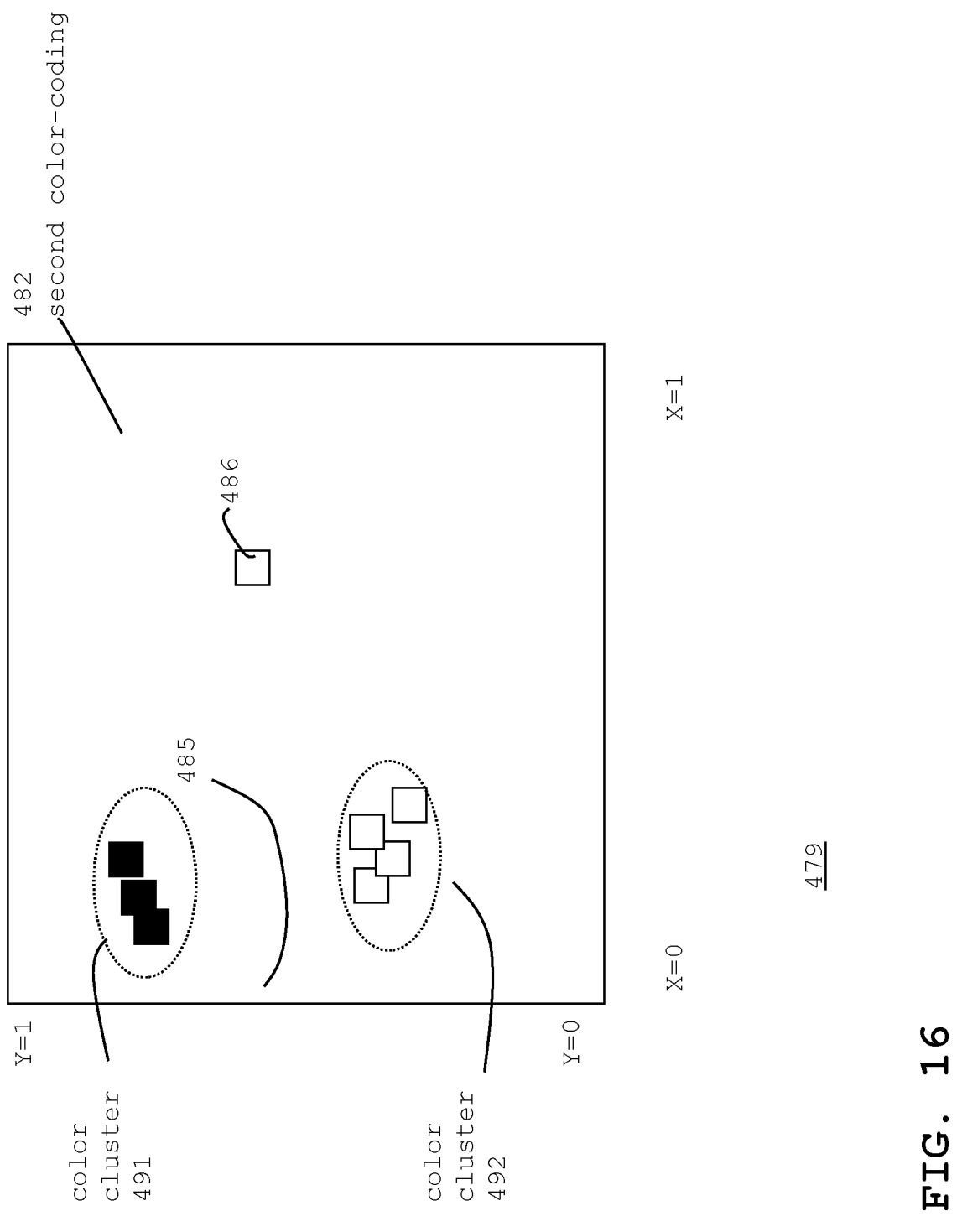
FIG. 16 illustrates clustering as a tool for assigning colors to binary pixel values.

FIG. 16 illustrates clustering as a tool for assigning colors to binary pixel values. The variety of similar colors is reflected by different color components. For example, some leaf pixels are coded in (R, G, B)=0.1, 0.8, 0.1), other leaf pixels are coded in (0.1, 0.9, 0.05) and so on. After transformation (and reduction to a single planar space, second color-coding 482), the pixel colors would be distributed in clusters. For example, a first cluster would be more with "green" pixels, a second cluster would be more with the "white" pixels. Of course, there is still no need to show the planar space (or the images) to a user, the "colors" are just illustrative examples.

FIG. 16 therefore illustrates planar color space 479 (X, Y) with occurrences of pixels with different colors. The small squares in planar color space 479 indicate particular pixel colors (i.e. particular second color-coding).

Different color groups can be differentiated by color clustering. Clustering techniques are available to the skilled person. For example, the skilled person can use support vector machines (SVM), Bayesian classifiers, Kmeans, k-nearest neighbors (KNN) in whatever dimensionality. In the example of FIG. 16, there is a first cluster 491 and a second cluster 492. Line 485 between both clusters corresponds to the threshold. The line is illustrated as a free-form line to illustrates that the "threshold" is not necessarily a particular value. In ND space, a (N−1)D structure would determine the separation between clusters. For example, in a 3D space, planes would determine the separation.

The binary classification depends on the cluster (leaf color cluster vs. insect color cluster). It is noted that the semantic (e.g., leaf or insect) does not matter. The computer that perform clustering (e.g., computer 303) does not have to know the semantics, for the computer the clusters do not stand for leaf or insect, they are just color codes.

Variations of the clustering approach are possible. A first approach disregards outliers can be disregarded (e.g., relatively few pixels in a color 486), a second approach disregards color that belong to other areas. For example, a some areas on the leaf would be spots in "brown" color (semantics: the insects have eaten holes into the leaf so that the background becomes visible). It is relatively easy to introduce minimal expert interaction: the human expert would identify these third color spots to be mapped to either the first or to the second binary values. In other words, few expert supervision is helpful when 3 or more cluster have to be mapped to binary values.

Image Sequence

Figure 17:
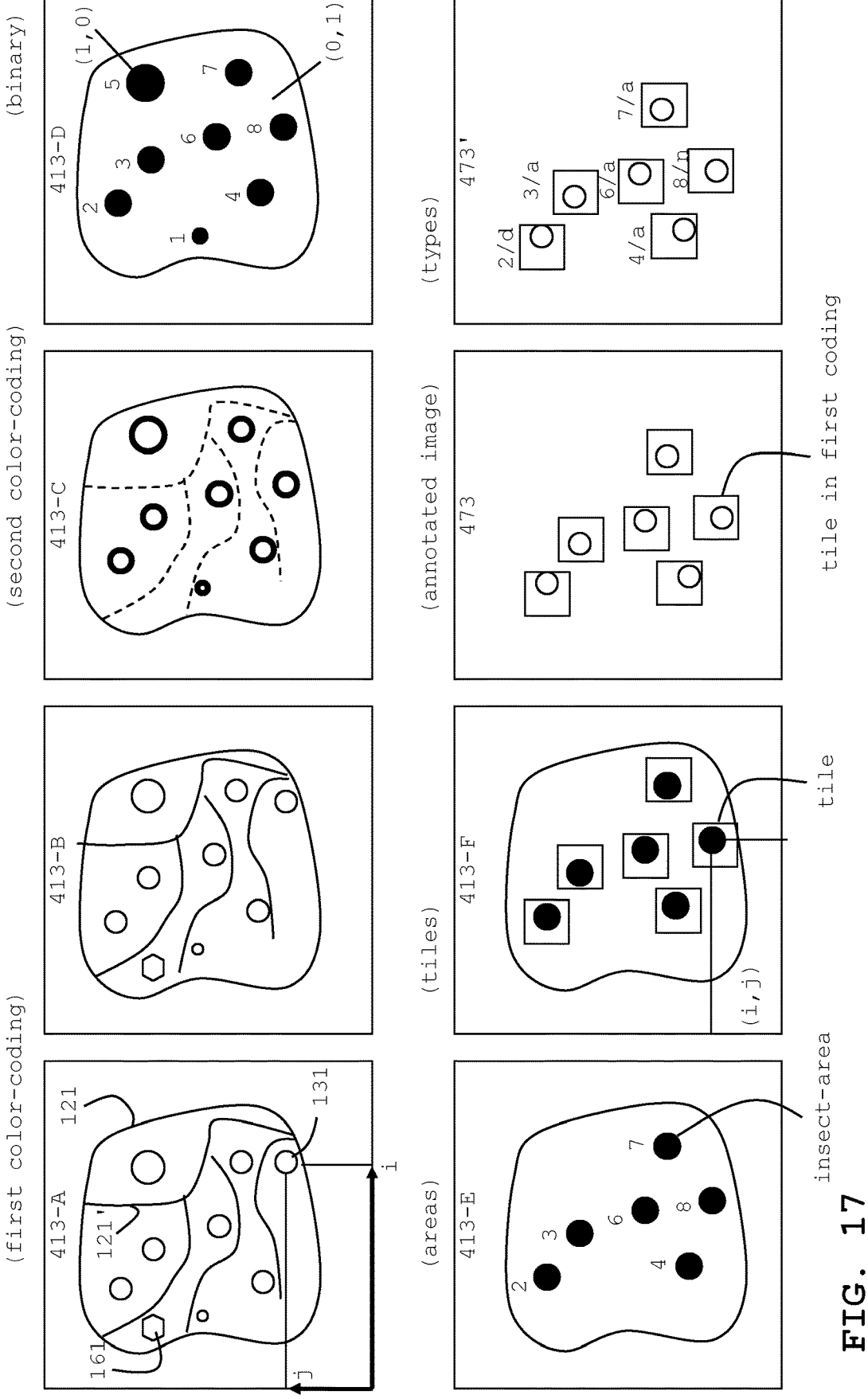
FIG. 17 illustrates a sequence of images.
Figure 18:
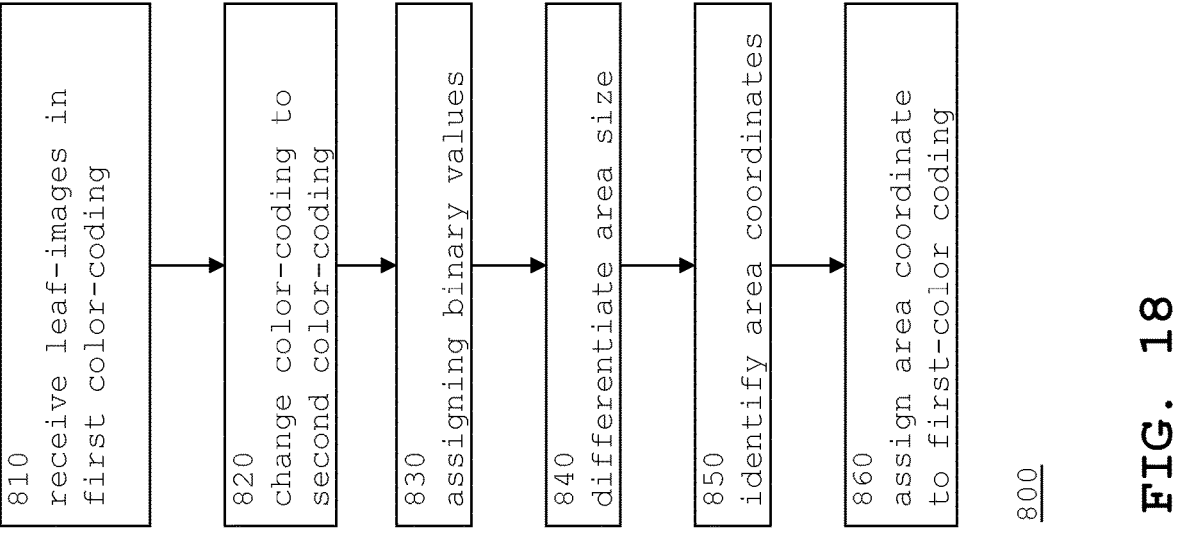
FIG. 18 illustrates a method-flow chart of computer-implemented method for generating a training set with annotated images.

The description now explains method 800 for providing training data by referring the FIG. 17 (images) and FIG. 18 (flowchart).

FIG. 17 illustrates a sequence of images, starting from image 413-A being a leaf-image, and ending at insect-annotated leaf image 473. By in large, the sequence follows the step of method 800.

The sequence is illustrated for convenience of explanation. Since computer 303 performs method 800 automatically, there is no need to show the images to a human user.

The method steps are explained for processing a single image, but computer 303 processes the method steps for a plurality of images 413-A. In an example, the computer has processed approximately 600 leaf-images 413-A to the same number of images 473.

For example, image 413-A is a leaf-image that can be obtained by performing method 602B. It does not matter, if image 413-A shows a single leaf only or if the area surrounding that single leaf are identified as to be ignored.

Image 413-A shows leaf 121 (cf. FIG. 1) by symbolizing the leaf border (or leaf edge, or leaf margin) by a plain line. For convenience, this plain line is kept for the other images of the sequence. The pixels outside the leaf (border) are being ignored.

Lines 121' illustrate folds and nerves of the leaf. There is a plurality of insects 131 shown on leaf 121 (or rather things that look like insects). The figure shows a plurality of 8 insect 131, and this low number is just used to keep the figure simple. These insects are not to be counted, but to be identified and located. The insects are illustrated here by circle symbols, just for simplicity, oval-shaped insects are introduced in FIGS. 1-2. The reader can imagine to have "white" spots on "green" leaves.

For computer 303 (FIG. 1, that executes the method) the semantical difference between "leaf" and "insect" does not (yet) matter.

In image 413-A, a small hexagon symbolizes a further object 161 that is located on leaf 121. For example, the object could be a water drop or a dust particle.

Image 413-A is color-coded in the first color-coding, for example in RGB because camera 311 (cf. FIG. 1) uses that coding.

The figure also uses image 413-A to illustrate pixel coordinates (i, j). The i, j notation distinguishes pixel coordinates (of the image) from color-coordinate (of the color space, cf. FIGS. 14-16).

Images 413-B and 413-C are images in different color-coding after transformation, as used herein RGB-to-XYZ transformation.

Image 413-B was obtained by a RGB-to-XYZ transformation (of image 413-A). Just transforming the coding does change the appearance of the image, and the human user would perceive colors differently.

Image 413-C is obtained from image 413-B by modifying the XYZ-coding. Modifying means to disregard one channel (X, Y, or Z). Image 413-C is in the second color-coding.

Image 413-C is in the second color-coding, for which the contrast is higher than for the first coding. The figures illustrate the contrast enhancement by showing the insects with bold circles. In the second color-coding, the contrast has been enhanced by the reduction from (X, Y, Z) to (X, Y) as explained. In other words, channel Z was disregarded. As a side-note, image 413-C does not show object 161 because in the second color-coding for object 161 is similar to that of leaf 121. It is advantageous that the coding change filters out such objects early during processing.

Image 413-D is in binary-coding. This is just illustrated by the leaves in "green" coded to (0,1) and the insects in "white" coded to (1, 0). The figure presents the color in negative, just to keep references visible.

(1,0) coded pixels can be grouped together to form areas of contiguous pixel (neighboring pixels in the same binary coding). In the example, the areas have borders where the pixel coding changes from (1, 0) to (0, 1). The figure illustrates areas 1 to 8.

Not all areas correspond to insects. The areas are candidates to show insects. The figure shows a small "insect" (smaller circle symbol of area 1) and a large "insect" (larger circle, area 5).

The areas can be quantified by numeric values (AREA-SIZE), for example, by counting the number of pixels (per area), by counting the highest number of pixels in one pixel coordinate (i, or j) etc. Other features of the regions that can be used as well, among them centroid, convexity, circularity, inner bounding box, outer bounding box, Euler number, etc.

According to a size criterion (numerical value(s)), the areas are classified into insect areas and non-insect areas.

For example, an area is an insect area for MIN<AREA-SIZE<MAX. Areas 1 and 5 are too small or too large, but areas 2-4 and 6-8 are insect areas.

The size criterion can be obtained by the computer, without the need to interact with human supervisors. For example, the MIN and MAX value can be obtained by evaluating a histogram and deriving statistical indicators (e.g., considering the standard deviation, MIN=AVERAGE minus SIGMA, MAX=AVERAGE plus SIGMA). This is just an example, the person of skill in the art can use different approaches.

The criterion can also be obtained from an expert user (cf. FIG. 1, 191), even by re-using results of the above-describe annotation process (cf. 701A in FIG. 3). The expert annotations provide size information as a side-product.

As illustrated by image 413-E, the non-insect areas are disregarded (or filtered out). The insect areas have center pixels (e.g., the pixel in that the longest line with constant i crosses the longest line with constant j). In other words, there is a collection of center pixels with center pixel coordinates. (In the example there are 6 center pixels, for 6 insect areas).

The pixels surrounding the center pixels show insect with some leaf parts. Computer 303 now takes over the surrounding pixel from the original image 413-A (in first color-coding with all 3 color channels). (or from image 413-B, with XYZ)

The pixels in a square around that center are forming "tiles". The size of the tiles is standardized, for example 96 pixel in direction of coordinate i and 96 pixel in direction of coordinate j. In other words, a tile can have 96×96 pixels. The pixel number is just taken for convenience because experiments showed that the size is big enough to contain an insect completely. However, variability of the size exists due to different resolution images and acquisition conditions.

The result is illustrated in image 473, the computer-annotated image 473 (having 6 tiles).

While FIG. 17 focuses on insect areas to obtain tiles (with insects), the person of skill in the art is able to obtain non-insect tiles accordingly so that training can use such non-insect tiles as well.

Increasing Accuracy

So far the approach illustrated by FIG. 17 does not require the interaction with human expert users. Most of the insect-tiles are expected to be tiles that actually show insects (true positives), some of the insect-tiles show something else (false positives). Most of the non-insect tiles show leaf portions without insect (correct negatives), but some of the non-insect tiles show insects indeed (true negatives).

But instead of letting expert user 191 looking at the relatively huge plurality of tiles (for multiple images), computer 303 can—optionally—use training data obtained with human interaction. As explained above, human-annotated images 471 are available. They are even available with (human made) annotation that differentiate insect classes. For example, FIG. 4 differentiates whitefly insects into "insect (1)" and "no-insect", and in a higher granularity into classes (1) to (4).

In other words, computer 301 (cf. FIG. 1, the co-operating computing function) has images for that annotations do differentiate already, for example, "alive whitefly", "dead whitefly" and "no whitefly". This data can be used to identify false positive/negatives. For image 473', FIG. 17 illustrates this optional result—sharpening approach: Computer 303 classifies the tile annotations according to types:

tiles 3, 4, 6 and 7 are for "a"="alive" (correct positive), tile 2 is for "d"="dead", and tile 8 does not show an insect (false positive). The person of skill in the art can decide in advance who to classify tiles such as tile 2.

The description continues using reference 473 standing for insect-annotated leaf-image, with computer-made annotations with or without the additional accuracy enhancement.

Method

FIG. 18 illustrates a method-flow chart of computer-implemented method 800 for generating a training set with annotated images. As already mentioned, annotated images 473 are to be used to train a convolutional neural network (CNN) for quantifying plant infestation by estimating the number $N_{EST}$ of insects 132 on leaves 122 of plants 112. Method 800 is being performed by computer 303 (cf. FIG. 1) and is explained be referring to FIGS. 14-17.

Computer 303 receives 810 leaf-images 413-A showing leaves 121 and showing insects 131 on the leaves 121. Leaf-images 413-A are coded in first color-coding 481.

Computer 303 changes 820 the color-coding of pixels 477, 478 of the leaf-images to second color-coding 482. Contrast 485 between the pixels for the insects and the pixels for the leaves is higher in the second color-coding than in the first color-coding.

Computer 303 assigns 830 pixels 477/478 in second color-coding 482 to a first binary value or to a second binary value. Color clusters are related to the first and second value: the pixels associated with the second color cluster are assigned to the second binary value.

Computer 303 differentiates 840—in the leaf-images with binary coding 413-D—areas with contiguous pixels in the first binary value into into non-insect areas 1, 5 and insect areas 2, 3, 4, 6, 7, 8 by an area size criterion.

Computer 303 identifies 850 pixel-coordinates of insect areas 2, 3, 4, 6, 7, 8 wherein the pixel-coordinates identify rectangular tile-areas with insects in the center.

Computer 303 annotates 860 leaf-images 414-A (in first color-coding 481) by assigning the pixel-coordinates (i, j) to corresponding tile-areas to obtain the annotated image 473.

Using the Annotated Image

Looking back, FIG. 8 illustrates an image being split into tiles or sub-regions. The tiles are already in a size that is suitable as input to CNN 271. In other words, the tiles correspond to tiles 401-k (alpha, with insects) and 401-k (gamma, without insects).

The approach implemented by computer 303 (method 800) can be applied to a plurality of leaf-images and the resulting (insect-by-computer) annotated images 473 can be used train CNN 271 (i.e., enable it to count the insects). There is no need to modify CNN 271, it just could be trained with a training set that comprises a first sub-set of annotated images {471} (insect-by-human annotated) and a second sub-set of images {473} (insect-by-computer-annotated).

Modifying the size of the tiles is possible, and the person of skill in the art can adapt the size to fit the tiles to the CNN input (i.e., corresponding to the tiles of the human-annotated images 471).

Using Annotated Images to Train the CNN

Despite the improvements explained for image 473/473', annotations can still be incorrect. In other words, images 473/473' can be considered as "weakly annotated" images. The description now explains an approach to address this constraint.

Figure 19:
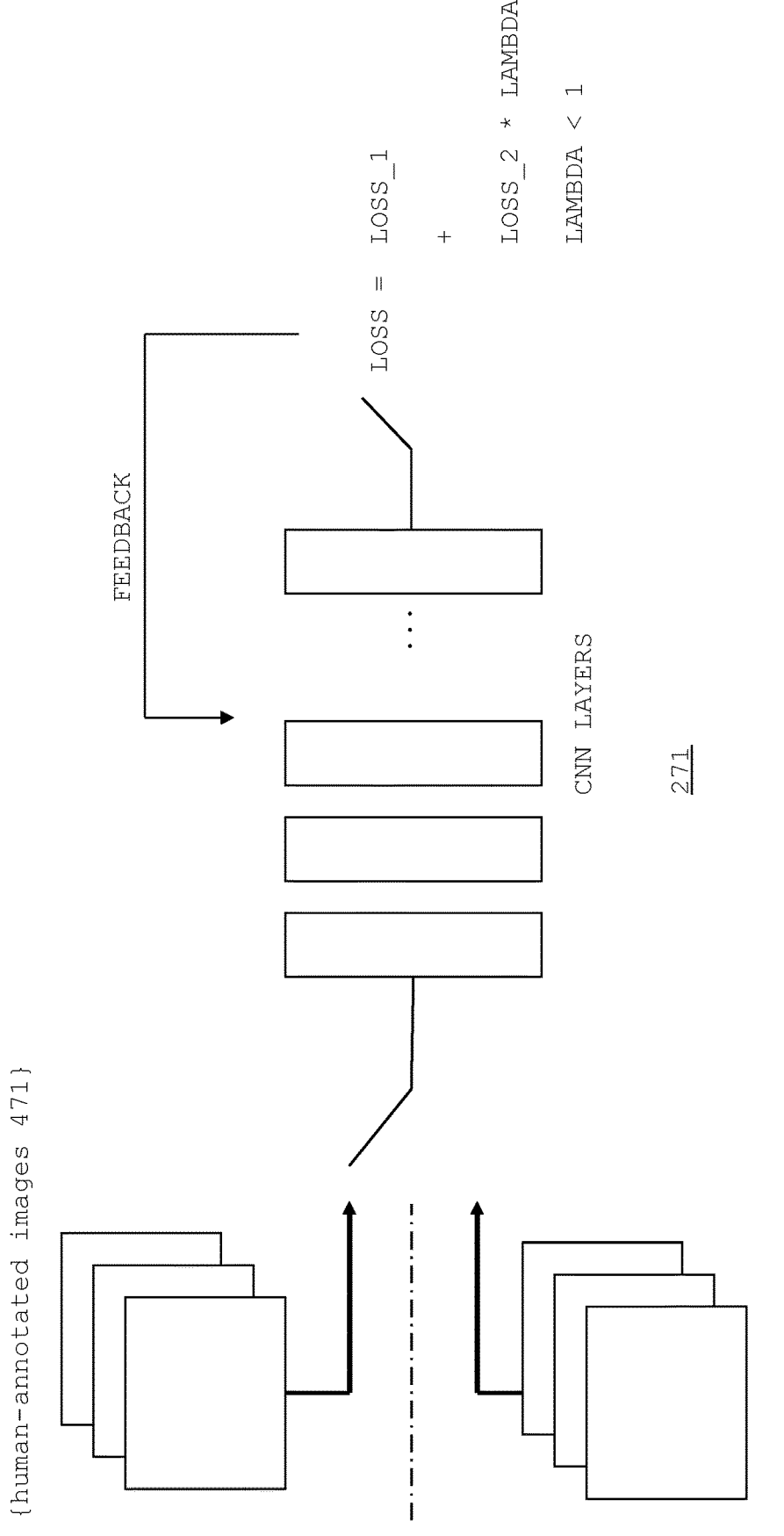
FIG. 19 illustrates a CNN being trained with human-annotated images and with computer-annotated images.

FIG. 19 illustrates CNN 271 being trained. As explained above, CNN 271 is trained by images 471 (cf. FIG. 1) and CNN 271 turns into CNN 272. In addition to that, CNN 271 can be trained by images 473 (insect-by-computer-annotated images) but the contribution of theses images 473 (to the training) is taken into account with less emphasis.

As explained above, training a CNN involves the calculation of loss values. The description has mentioned to train CNN 271 by using a loss-function that is the mean absolute error (MAE) or that is the mean square error (MSE).

Taking the MSE as an example, there is LOSS_1=MSE (471) resulting from training with insect-by-human-annotated images, and there is LOSS_2=MSE (473) resulting from training with insect-by-computer-annotated images). FIG. 19 illustrates this approach by switch symbols at the input of the CNN and a the part of the CNN that calculates the loss function. Both LOSS_1 and LOSS_2 are calculated according to the same formulas, but both values are kept separately.

The overall loss LOSS can be calculated as the weighted sum of both errors, that is $$LOSS=LOSS\_1+\lambda*LOSS\_2.$$

The lambda value is smaller than 1 so that the contribution of the computer-annotated images is less trusted.

As in FIG. 1, CNN 271 is being trained with human-annotated images 471 and with computer-annotated images 473 (optionally with the improvements of 473'). FIG. 19 illustrates a first sub-set {471} and a second sub-set {473}, and illustrates that the images go into the network consecutively. During processing, the network calculates the loss function (described above) and uses the loss function (in a feedback loop, with the overall LOSS) to fine-tune the parameter (or layer-specific values), as explained above.

Since computer-made annotations are less trusted than human-made annotations, the contribution to the loss function is weighted differently. The CNN having processed an image from the first sub-set {471} uses the loss result fully, the CNN having processed an image from the second sub-set {473} uses the loss result partially (with the lambda factor).

The illustration is symbolically: Factor lambda (small 1) that is applied to the loss values LOSS_2. The factor decreases the impact by that the loss values provide the feedback.

Further Implementation Details

To enhance understanding, the description has described a scenario with field user 192 operating mobile device 302. This however not required, image 412 could be taken otherwise, for example by aircraft flying over the field. The example of an unmanned aerial vehicle (UAV) is noted.

In such a scenario, the mobility to catch images on the field would be implemented by the UAV. User interface 392 (cf. FIG. 2) of a smartphone or the like (to communicate the results to field user 191) would potentially implemented otherwise.

Further Discussion of Biological Objects

As explained above—for example, in connection with FIG. 8—the tiles have smaller dimensions than the images, and the tile dimensions correspond to the input layer dimension of CNN 271/272. Since the biological objects (e.g., the insects) are represented in the tiles (both in the training phase as annotations and in the production phase), the physical sizes of the biological object are limited to a maximal physical size. In the extreme case (maximum), the biological object of the largest allowable physical size would correspond to the representation of that object on a single tile. In other words, the relation of the physical size of the biological objects (132) to the physical size of the parts (122) is such that the representation of the biological objects on the part-images (422) are such that the representation is smaller than the tile dimension.

Persons of skill in the art can estimate the image resolution (i.e., the number of pixels per physical dimension). There is also a limitation to the minimum. In the extreme case (minimum), the biological object of the smallest allowable size would be represented (in theory) by one pixel. More practical sizes have been explained above (cf. FIG. 5, 30 pixels times 20 pixels). This translates to absolute minimum size of biological objects that can be recognized. Usually, the biological objects have at least 0.1 mm in diameter, preferably at least 0.5 mm, more preferably at least 1 mm, most preferably at least 5 mm in diameter. From a high level perspective, the biological objects (132) are (or were) living organisms that are located on the parts (122) (of the plant), or the biological objects are traces by that organisms. (Optionally, the organism may be considered as no longer living, cf. the example with the pupa). More in detail, the biological objects (132) on the parts (122) (of the plant) are selected from the following: insects, arachnids, and mollusca. In an alternative, the biological objects are selected from spots or stripes on the surface of the plant parts. In that alternative, it does not matter if the objects are considered to be organisms or not, spots or stripes can be disease symptoms. For example, brown spots or brown stripes on a plant part indicates that the plant is potentially damaged. For example, some fungi cause brown stripes like yellow rust. In view of the size (min/max) limitations, not all insects, arachnids or mollusca (or spots and stripes) would fit. For example, a large butterfly insect would potentially cover a single leaf (not countable), but small whiteflies (or a thrips) would be countable, as explained with much detail.

Computer System

Figure 20:
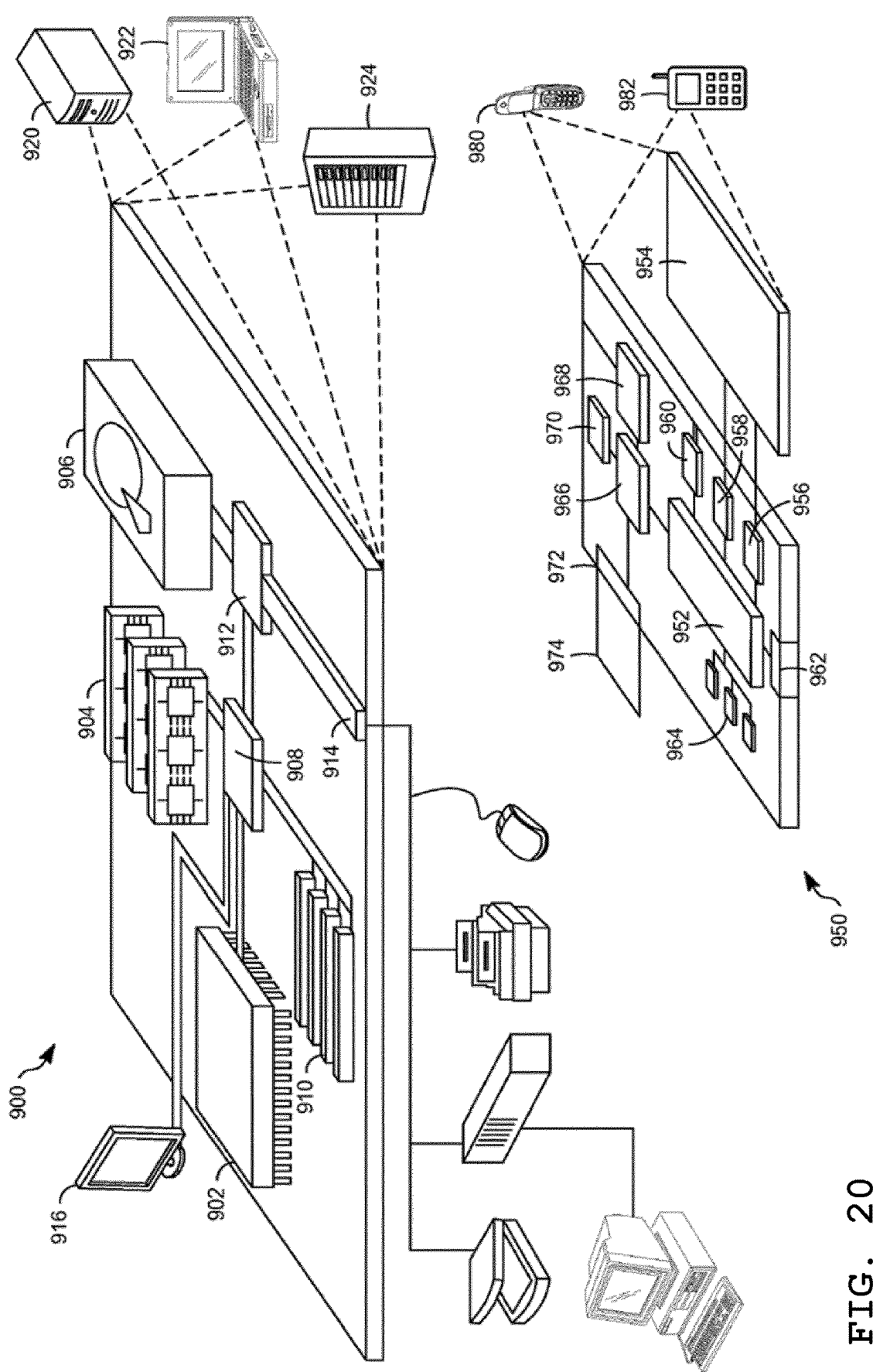
FIG. 20 illustrates a generic computer system.

FIG. 20 illustrates an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to computers 201/202 of FIGS. 1-2. Computing device 950 is intended to represent various forms of mobile devices, such as personal digital assistants, cellular telephones, smart phones, and other similar computing devices. For example, computing device 950 may include the data storage components and/or processing components of devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

REFERENCES (1),(2) . . . insect class
(i), (ii) insect species
$\alpha$ . . . $\zeta$ insect annotations
1, 2, 3 use cases
S set cardinality for images
X, Y, i, j image coordinates in general
X', Y' annotation coordinates
(A) . . . (D) development stages
111/112 plant
121/122 leaf
131/132 insect (with stages A, B, C, D)
141/142 non-insect object
161 water drop
191/192 user
201/202 computer
261/271 CNN (leaf segmentation)
261/271 CNN (insect detection)
301, 303 computer
302 computer (mobile device)
311/312 camera
342 communication network
392 user interface
411/412 plant-image(s)
421/422 leaf-image(s)
429 to-be-ignored portions in leaf-images
431/432 insect on image
441/442 non-insect object on image
451 polygon
461, 471, 473 annotated images
477, 478 pixels
479 planar color space
481, 482 color-coding
485 contrast
491, 492 clusters
501-*k*/502-*k* density maps
503-505 graph elements
555 combined density map
6\*\*A pre-processing activities
6\*\*B, 8\*\* methods, steps
9\*\* generic computer, with components

The invention claimed is:
1. A computer-implemented method for generating a training set with annotated images, wherein the annotated images are to be used to train a convolutional neural network (CNN) for quantifying plant infestation by estimating a number of biological objects on leaves of plants, the method comprising:

receiving a plurality of leaf images showing the leaves and showing the biological objects on the leaves, the leaf images being coded in a first color-coding;

changing the color-coding of the pixels in the leaf images to a second color-coding, the pixels in the leaf images including pixels for the biological objects and pixels for the leaves, wherein a contrast between the pixels for the biological objects and the pixels for the leaves is higher in the second color-coding than in the first color-coding;

assigning the pixels in the leaf images associated with a first color cluster in the second color-coding to a first binary value, and the pixels in the leaf images associated with a second color cluster to a second binary value;

differentiating the leaf images having binary coding, comprising areas with contiguous pixels in the first binary value into non-object areas and object areas by an area size criterion;

identifying pixel coordinates of the object areas of the pixels of the leaf images, wherein the pixel coordinates identify rectangular tile areas with biological objects center centered therein, with the tile areas having an input dimension for the CNN; and annotating the leaf mages in the first color-coding by assigning the pixel coordinates to the corresponding rectangular tile areas to obtain the annotated images.

2. The method of claim 1, wherein receiving the leaf images comprises receiving images showing isolated segmented leaves, wherein each leaf image of the leaf images shows the leaf with its margin substantially completely.

3. The method of claim 2, wherein receiving comprises obtaining the images with the isolated segmented leaves by performing leaf segmentation using the CNN that has been trained by processing leaf-annotated plant images that show annotated borders between leaf and background, and between leaf and leaf.

4. The method of claim 1, wherein the first color-coding is RGB, and wherein changing the color-coding comprises a transformation from the RGB to XYZ.

5. The method of claim 4, wherein changing the color-coding further comprises obtaining the second color-coding by disregarding a Z-component from the XYZ color space.

6. The method of claim 5, wherein assigning is performed by clustering the pixels in the leaf images into color clusters.

7. The method of claim 6, wherein the color clusters are identified by a support-vector machine.

8. The method of claim 6, wherein identifying the pixel coordinates is performed with the rectangles of the rectangular tile areas being squares of 96×96 pixels.

9. The method of claim 1, further comprising classifying the rectangular tile areas according to object classes and sorting out false positives.

10. The method of claim 1, wherein
the biological objects are insects,
the non-object areas are non-insect areas, and
the object areas are insect areas.

11. The method of claim 1, wherein relation of physical size of the biological objects to the physical size of the leaves is such that a representation of the biological objects on the leaf images are such that the representation is smaller than the dimension of the tile areas.

12. The method according of claim 11, wherein the biological objects are selected from the following: insects, arachnids, and mollusca, or wherein the biological objects are selected from the following: spots or stipes on a surface of plant parts.

13. A computer adapted to perform the method of claim 1.

14. A non-transitory computer-readable medium having a computer program product encoded thereon that, when loaded into a memory of a computer and executed by at least one processor of the computer, causes the at least one processor to perform the method of claim 1.

15. A computer-implemented method for quantifying plant infestation by estimating a number of biological objects on leaves of a particular plant, the method comprising:

receiving a plant image taken from the particular plant, the plant image showing at least one of the leaves of the particular plant;

using a first convolutional neural network to process the plant image to derive a leaf image comprising a contiguous set of pixels that show a main leaf of the particular plant completely, the first convolutional neural network having been trained by a plurality of leaf-annotated plant images, wherein the plant images are annotated to identify main leaves;

splitting the leaf image into a plurality of tiles, the tiles being segments of the plant image having pre-defined tile dimensions;

using a second convolutional neural network to separately process the plurality of tiles to obtain a plurality of density maps having map dimensions that correspond to the tile dimensions, the second convolutional neural network having been trained by processing object-annotated plant images, wherein a first subset of the object-annotated plant images is obtained by interacting with an expert user, and a second subset of the object-annotated plant images is obtained by performing the method of claim 1, the processing comprising the calculation of convolutions for each pixel of the contiguous set of pixels based on a kernel function resulting in density maps with different integral values for tiles showing the biological objects and tiles not showing the biological objects; and combining the plurality of density maps to form a combined density map in the dimension of the leaf image, and integrating the pixel values of the combined density map to obtain an estimated number of the biological objects for the main leaf.

16. The method of claim 15, wherein the biological objects are insects, and the object-annotated plant images are insect-annotated plant images.

* * * * *